United States Patent
Pmsvvsv et al.

(10) Patent No.: US 12,046,897 B2
(45) Date of Patent: Jul. 23, 2024

(54) HYBRID FUEL CELL SYSTEM FOR LOAD FOLLOWING AND BACKUP IN A MICROGRID AND METHOD OF OPERATING THEREOF

(71) Applicant: BLOOM ENERGY CORPORATION, San Jose, CA (US)

(72) Inventors: Prasad Pmsvvsv, Sunnyvale, CA (US); Jayakumar Krishnadass, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/052,638

(22) Filed: Nov. 4, 2022

(65) Prior Publication Data

US 2023/0146728 A1    May 11, 2023

Related U.S. Application Data

(60) Provisional application No. 63/278,409, filed on Nov. 11, 2021.

(51) Int. Cl.
*H02J 1/10* (2006.01)
*H01M 8/04858* (2016.01)
(Continued)

(52) U.S. Cl.
CPC ......... *H02J 1/102* (2013.01); *H01M 8/04858* (2013.01); *H01M 8/2425* (2013.01);
(Continued)

(58) Field of Classification Search
CPC .............. H02J 2300/30; H02J 1/10–12; H02J 3/28–322; H02J 3/38–50; H02J 9/061;
(Continued)

(56) References Cited

U.S. PATENT DOCUMENTS

| 8,440,362 B2 | 5/2013 | Richards et al. |
| 9,190,693 B2 | 11/2015 | Sridhar et al. |

(Continued)

FOREIGN PATENT DOCUMENTS

WO    WO 2013/048705 A1    4/2013

OTHER PUBLICATIONS

Andrew L. Dicks, R.G. Fellows, C. Martin Mescal, Clive Seymour, "A study of SOFC-PEM hybrid systems", Apr. 5, 2000, Journal of Power Sources, vol. 86, Issues 1-2, 2000, pp. 501-506. (Year: 2000).*

(Continued)

*Primary Examiner* — Rexford N Barnie
*Assistant Examiner* — David A Shiao
(74) *Attorney, Agent, or Firm* — THE MARBURY LAW GROUP PLLC

(57) ABSTRACT

A method for operating a fuel cell system includes drawing a base level DC electric energy from a first fuel cell of a first type to a combined DC bus, measuring a DC voltage at the combined DC bus, determining whether the DC voltage at the combined DC bus falls short of a DC voltage threshold, and drawing a variable DC electric energy from a second fuel cell of a second type different from the first type in response to determining that the DC voltage at the combined DC bus falls short of the DC voltage threshold.

18 Claims, 17 Drawing Sheets

(51) Int. Cl.
*H01M 8/2425* (2016.01)
*H01M 8/2495* (2016.01)
*H02J 3/38* (2006.01)
*H02J 9/06* (2006.01)
*H01M 8/12* (2016.01)

(52) U.S. Cl.
CPC ............ *H01M 8/2495* (2013.01); *H02J 3/38* (2013.01); *H02J 9/061* (2013.01); *H01M 2008/1293* (2013.01); *H02J 2300/30* (2020.01)

(58) Field of Classification Search
CPC .......... B64D 2221/00; B64D 2041/005; B60L 50/70–75; B60L 58/30–40
See application file for complete search history.

(56) References Cited

U.S. PATENT DOCUMENTS

| | | | |
|---|---|---|---|
| 9,225,202 B1 | 12/2015 | Kim et al. | |
| 9,639,130 B2 | 5/2017 | Gurunathan et al. | |
| 10,367,215 B2 | 7/2019 | Pmsvvsv et al. | |
| 10,541,433 B2 | 1/2020 | Patel et al. | |
| 10,601,226 B2 | 3/2020 | Gurunathan et al. | |
| 10,651,479 B2 | 5/2020 | Liao et al. | |
| 10,666,058 B2 | 5/2020 | Ballantine et al. | |
| 10,873,099 B1 | 12/2020 | Gurunathan et al. | |
| 11,258,294 B2 | 2/2022 | Pmsvvsv et al. | |
| 11,387,476 B2 | 7/2022 | Pmsvvsv et al. | |
| 2005/0154499 A1 | 7/2005 | Aldridge et al. | |
| 2006/0228593 A1 | 10/2006 | Grieve et al. | |
| 2009/0115252 A1 | 5/2009 | Caraghiorghiopol et al. | |
| 2010/0013313 A1 | 1/2010 | Groff et al. | |
| 2010/0066431 A1 | 3/2010 | Carter | |
| 2011/0273022 A1* | 11/2011 | Dennis | H02J 7/34 307/72 |
| 2012/0161516 A1* | 6/2012 | Koshin | H01M 8/04925 307/31 |
| 2012/0267952 A1* | 10/2012 | Ballatine | H02J 7/34 307/26 |
| 2012/0299386 A1* | 11/2012 | Kaufman | H02J 3/388 323/311 |
| 2013/0099565 A1* | 4/2013 | Sachs | H02J 3/381 307/25 |
| 2014/0285010 A1* | 9/2014 | Cameron | H02J 7/35 307/29 |
| 2015/0121113 A1 | 4/2015 | Ramamurthy | |
| 2015/0130277 A1 | 5/2015 | Ballantine et al. | |
| 2015/0162625 A1* | 6/2015 | Cheatham, III | H01M 8/0494 429/430 |
| 2015/0288220 A1 | 10/2015 | Gurunathan et al. | |
| 2017/0005480 A1 | 1/2017 | Ballantine et al. | |
| 2017/0338502 A1 | 11/2017 | Pmsvvsv et al. | |
| 2018/0134401 A1 | 5/2018 | Halsey et al. | |
| 2018/0141674 A1* | 5/2018 | Bailey | H01M 8/04201 |
| 2019/0229535 A1 | 7/2019 | Pmsvvsv et al. | |
| 2019/0245216 A1 | 8/2019 | Liao et al. | |
| 2019/0312432 A1 | 10/2019 | Gurunathan et al. | |
| 2019/0312441 A1 | 10/2019 | Ballantine et al. | |
| 2020/0020964 A1 | 1/2020 | Pmsvvsv et al. | |
| 2020/0076200 A1 | 3/2020 | Ballantine et al. | |
| 2020/0136423 A1* | 4/2020 | Haxhiu | H01M 8/04888 |
| 2020/0212459 A1 | 7/2020 | Ballantine et al. | |
| 2020/0266658 A1 | 8/2020 | Cottuli et al. | |
| 2020/0280183 A1* | 9/2020 | Yamashita | H02J 7/35 |
| 2021/0152016 A1 | 5/2021 | Pmsvvsv et al. | |
| 2021/0234397 A1 | 7/2021 | Das et al. | |
| 2021/0257638 A1 | 8/2021 | Pmsvvsv et al. | |
| 2021/0359540 A1 | 11/2021 | Pmsvvsv et al. | |
| 2021/0359623 A1 | 11/2021 | Pmsvvsv et al. | |

OTHER PUBLICATIONS

Tan, L.J., Yang, C. and Zhou, N., "Performance of the Solid Oxide Fuel Cell (SOFC)/Proton-Exchange Membrane Fuel Cell (PEMFC) Hybrid System", Nov. 24, 2015, Chem. Eng. Technol., 39: 689-698. (Year: 2015).*
USPTO Office Communication, Non-Final Office Action for U.S. Appl. No. 17/321,116, dated Feb. 15, 2022.
USPTO Office Communication, Non-Final Office Action for U.S. Appl. No. 17/321,116, dated Nov. 4, 2022.
European Office Communication, extended search report from the European Patent Office (EPO) for European Patent Application No. 22205524, mailed Apr. 25, 2023, 7 pages.

* cited by examiner

HYBRID FUEL CELL SYSTEM FOR LOAD FOLLOWING AND BACKUP IN A MICROGRID AND METHOD OF OPERATING THEREOF

FIELD

The present disclosure is directed to direct current (DC) power sources, such as fuel cell systems with a different type of fuel cells for managing variable load demand.

BACKGROUND

Electric energy generator systems can support variable loads through various configurations. These electric energy generator systems are expected to continuously vary electric energy output to maintain a power quality to the variable loads. Known energy generator systems rely on non-generating, electric energy storage systems, such as batteries, combustion type energy generators, such as diesel generators, and/or external electric energy sources, such as an electric utility grid, to provide electric energy output of variable portions of loads.

SUMMARY

Figure 1:
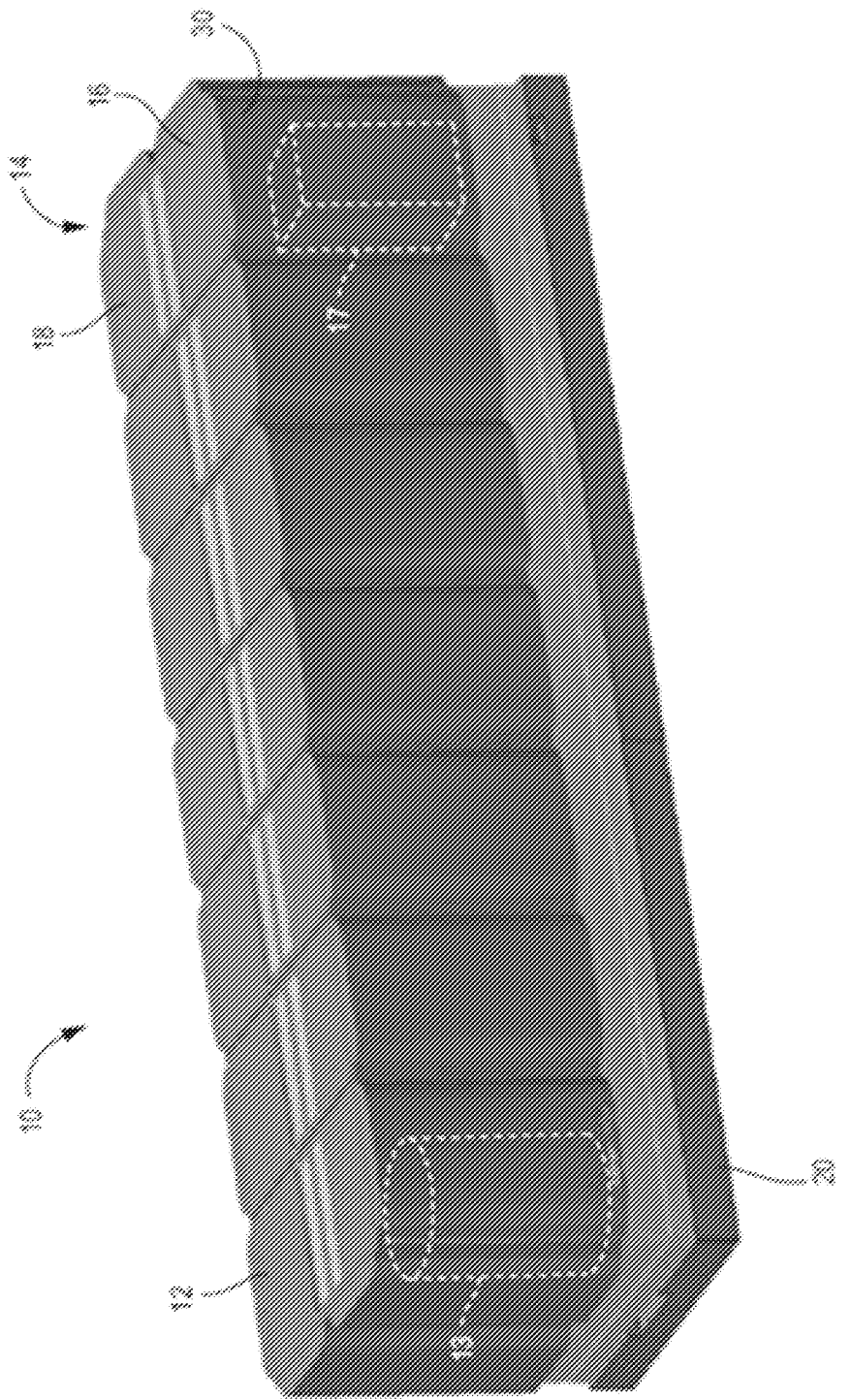
FIG. 1 is a perspective view of a fuel cell system according to various embodiments suitable for implementing various embodiments.

According to one embodiment, a method for operating a fuel cell system includes drawing a base level DC electric energy from a first fuel cell of a first type to a combined DC bus, measuring a DC voltage at the combined DC bus, determining whether the DC voltage at the combined DC bus falls short of a DC voltage threshold, and drawing a variable DC electric energy from a second fuel cell of a second type different from the first type in response to determining that the DC voltage at the combined DC bus falls short of the DC voltage threshold.

According to another embodiment, a fuel cell system, comprises a first fuel cell of a first type, a second fuel cell of a second type different from the first type, a first direct current (DC)/DC converter electrically connected to the first fuel cell via a first DC bus, a second DC/DC converter electrically connected to the second fuel cell via a second DC bus, and a DC/alternating current (AC) inverter electrically connected in parallel to the first DC/DC converter and to the second DC/DC converter via a combined DC bus.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the term "storage system" and "energy storage system" are used interchangeably to refer to any form of energy storage that may be converted to electric power, such as electrical storage, mechanical storage, electromechanical storage, electrochemical storage, thermal storage, etc. Examples may include a battery, a capacitor, a supercapacitor, a flywheel, a liquid reservoir, a gas reservoir, etc. In some embodiments, the energy storage system may include any combination of components configured to control electric energy output of the energy storage system, such as an electric connection device and/or an electric energy conditioning device, in response to a signal from a controller and/or an electric energy bus.

As used herein, the terms "electric energy" and "electric energy output" are referred to amounts of electric voltage, current, or power. Examples herein described in terms of voltage do not limit the scope of the claims and descriptions to such types of electric energy and electric energy output.

Various embodiments include electrical circuits, electrical components, and methods for hybrid fuel cell system load following and backup. A hybrid fuel cell system, employing multiple types of fuel cells having different characteristics suitable for different situations, may be configured to control the different fuel cells (e.g., a first fuel cell stack containing first type of fuel cells, such as solid oxide fuel cells, and a second fuel cell stack containing second type of fuel cells, such as proton exchange membrane fuel cells) in different manners. For example, the hybrid fuel cell system may be configured to control a first fuel cell (e.g., a first type of fuel cell stack) for consistent electric energy output, and to control a second fuel cell (e.g., a second type of fuel cell stack) for electric energy output for a load demand exceeding the consistent electric energy output of the first fuel cell system. The hybrid fuel cell system may be configured to control the second fuel cell to follow variable load demands exceeding the consistent electric energy output of the first fuel cell.

Electric energy generator systems can support variable loads through various configurations. These electric energy generator systems are expected to continuously vary electric energy output to maintain a power quality to the variable loads. Some known energy generator systems rely on non-generating, electric energy storage systems, such as batteries, to provide electric energy output of variable portions of loads. For example, an electric energy generator system configured as a grid isolated or paralleled microgrid is configured to support a variable portion of a load by employing a non-generating, electric energy storage system. The non-generating, electric energy storage system outputs electric energy following the variable portion of the load. Such electric energy generator systems incorporating non-generating, electric energy storage systems suffer from complex site design to optimize electric energy generator and non-generating, electric energy storage size, lack of flexibility for intermittent overloads unless there is a reserved capacity factor, poor round trip efficiency of non-generating, electric energy storage power, etc.

Other known electric energy generator systems rely on combustion type energy generators, such as diesel generators, to provide electric energy output of variable portions of loads. For example, an electric energy generator system configured as a grid isolated or paralleled microgrid is configured to support a variable portion of a load by employing a combustion type energy generator. The combustion type energy generator outputs electric energy following the variable portion of the load. Such electric energy generator systems incorporating combustion type energy generators suffer from emissions generated by the combustion of a fuel by the combustion type energy generators.

Other known electric energy generator systems rely on external electric energy sources, such as an electric utility grid, to provide electric energy output of variable portions of loads. For example, an electric energy generator system can be configured as a grid paralleled microgrid that relies on the electric utility grid to support a variable portion of a load. However, when the electric utility grid fails or during an emergency grid isolation event, the electric energy generator system must rely on a non-generating, electric energy storage system or a combustion type energy generator to support the variable portions of a load. During an extended grid failure or isolation (e.g., a few days to weeks, such as power shut down events due to wild fires or other weather events such as hurricanes), the electric energy generator system with a non-generating electric energy storage system is not economical from an equipment cost and a real estate cost point of view. During an extended grid failure or isolation, the electric energy generator system with a combustion type energy generator will suffer from increased emissions generated by the combustion of a fuel by the combustion type energy generators over increased durations.

Embodiments herein address the foregoing issues with known electric energy generator systems which use non-generating, electric energy storage system and/or a combustion type energy generator to support the variable portions of loads, by implementing a hybrid fuel cell system, employing multiple types of fuel cells having different characteristics suitable for different situations. The system may be configured to control the different fuel cells in different manners. The present inventors realized that solid oxide fuel cells (SOFCs) offer high efficiency and life at constant power output, and thus are well suited for base load applications in a microgrid. In contrast, proton exchange membranes (PEM) fuel cells offer a quicker start and better load following capabilities than SOFCs due to low operating temperature, and are well suited for backup power and varying loads in islanded mode of a microgrid. A hybrid fuel cell system may be configured to control a SOFC (e.g., a SOFC stack) for consistent electric energy output, and to control a PEM fuel cell (e.g., a PEM fuel cell stack) for electric energy output to satisfy a load demand exceeding the consistent electric energy output of the SOFC. The hybrid fuel cell system may be configured to control the PEM fuel cells to follow variable load demands exceeding the consistent electric energy output of the SOFCs. The hybrid fuel cell system using both SOFCs and PEM fuel cells may utilize the SOFCs to support base portions of loads and the PEM fuel cells to support variable portions of the loads, and may provide superior performance over known electric energy generator systems using a non-generating, electric energy storage system and/or a combustion type energy generator to support the variable portions of loads. Similarly, the hybrid fuel cell system using the SOFCs to support base portions of loads and using PEM fuel cells to support variable portions of the loads may provide superior performance over fuel cell systems using the SOFCs and PEM fuel cells separately.

Control of the hybrid fuel cell system such that a SOFC may provide a consistent electric energy output and a PEM fuel cell may provide electric energy output following variable load demands exceeding the consistent electric energy output of the SOFC may enable the hybrid fuel cell system to support variable loads in various grid independent, grid failure, or gird isolation situations. For example, the hybrid fuel cell system may be controlled to support variable loads in a grid independent microgrid application to enable variable load following and/or emergency load support. In another example, the hybrid fuel cell system may be controlled to support variable loads in a grid parallel microgrid application to enable peak shaving, grid failure backup, and/or emergency load support.

Control of the hybrid fuel cell system may be based on direct current (DC) electric voltage, or DC voltage, on a combined DC bus configured to transmit DC electric energy from both the SOFCs and the PEM fuel cells. The combined DC bus may transmit the DC electric energy to a load. An alternating current (AC)/DC inverter may receive the DC electric energy from the combined DC bus, convert the DC electric energy to AC electric energy, and transmit the AC electric energy to the load. The AC/DC inverter may be controlled to draw DC electric energy from the PEM fuel cells in response to a determination that the DC voltage on the combined DC bus falls short of a threshold. The AC/DC inverter may be controlled to increase or decrease draw of DC electric energy from the PEM fuel cells in response to a determination whether the DC voltage on the combined DC bus satisfies a variable portion of a load demand of the load above the threshold. The AC/DC inverter may be controlled to cease draw of DC electric energy from the PEM fuel cells in response to a determination that the DC voltage on the combined DC bus does not exceed the threshold.

FIG. 1 illustrates an example of one electrical power generator which comprises modular fuel cell system that is more fully described in U.S. Pat. No. 8,440,362, incorporated herein by reference for descriptions of the modular fuel cell system. The modular system may contain modules and components described above as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
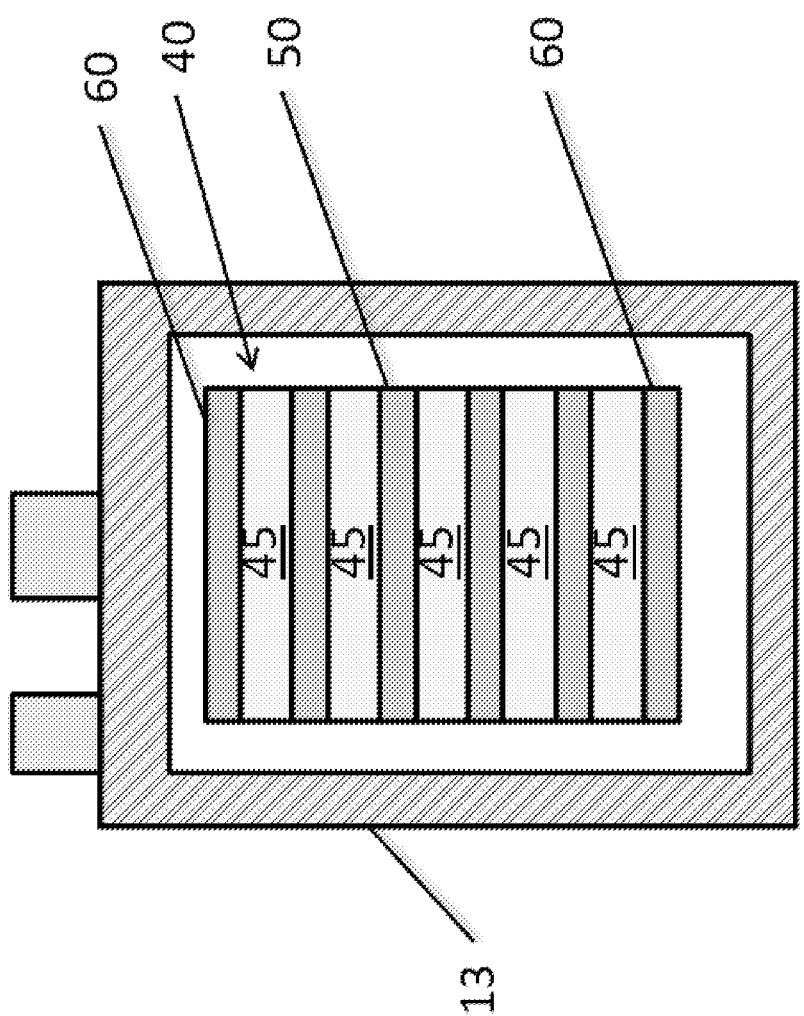
FIG. 2 is a schematic side cross-sectional view of a hot box according to various embodiments suitable for implementing various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Figure 3:
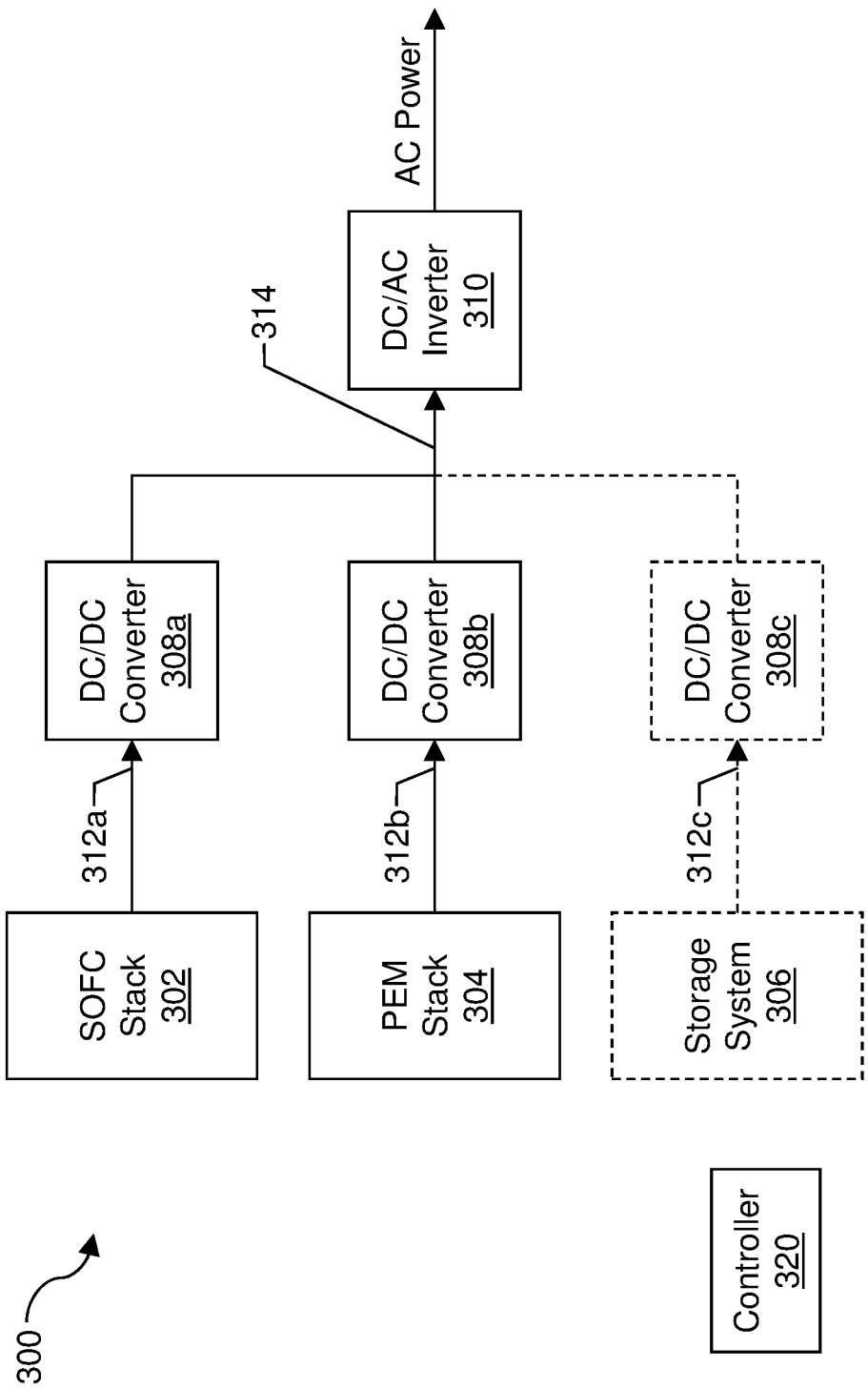
FIG. 3 is a component block diagram of a hybrid fuel cell system suitable for implementing various embodiments.

FIG. 3 illustrates a hybrid fuel cell system 300 suitable for implementing various embodiments. With reference to FIGS. 1-3, the hybrid fuel cell system 300 may include a SOFC stack 302 and a PEM fuel cell stack (which is referred to herein as "PEM stack" for brevity) 304 configured for generating DC electric energy to support a load (not shown). The SOFC stack 302 may be located in one or more power modules 12 illustrated in FIG. 1, while the PEM stack 304 may be located in one or more other power modules 12 illustrated in FIG. 1. Alternatively, the SOFC stack 302 and PEM stack 304 may be located different power modules 12 located in different rows and/or on different bases. Alternatively, the SOFC stack 302 and PEM stack 304 may be located in the same power module 12. It should be understood that the system 300 may include plural SOFC stacks 302 and/or plural PEM stacks 304.

The hybrid fuel cell system 300 may include various power conditioning components, such as any number and combination of DC/DC converters 308a, 308b and at least one DC/AC inverter 310. The SOFC stack 302 may be electrically connected to the DC/DC converter 308a via a DC bus 312a. The PEM stack 304 may be electrically connected to the DC/DC converter 308b via a DC bus 312b.

The DC buses 312a, 312b may be configured to transmit DC electric energy from the SOFC stack 302 to the DC/DC converter 308a and from the PEM stack 304 to the DC/DC converter 308b. The DC/DC converters 308a, 308b may be electrically connected to the DC/AC inverter 310 via a combined DC bus 314. The combined DC bus 314 may be configured to transmit DC electric energy from the DC/DC converters 308b, 308b to the DC/AC inverted 310.

The hybrid fuel cell system 300 may optionally include an electric energy storage system 306. For example, the electric energy storage system 306 may include electrical storage, mechanical storage, electromechanical storage, electrochemical storage, thermal storage, etc. Examples may include a battery, a capacitor, a supercapacitor, a flywheel, a liquid reservoir, a gas reservoir, etc. The hybrid fuel cell system 300 may include various additional optional power conditioning components, such as any number and combination of DC/DC converters 308c. The electric energy storage system 306 may be electrically connected to the DC/DC converter 308c via a DC bus 312c. The DC bus 312c may be configured to transmit DC electric energy from the electric energy storage system 306 to the DC/DC converter 308c. The DC/DC converter 308c may be electrically connected to the DC/AC inverter 310 via the combined DC bus 314. The combined DC bus 314 may be configured to transmit DC electric energy from the DC/DC converter 308c to the DC/AC inverter 310.

The hybrid fuel cell system 300 may include any number and combination of controllers 320 (e.g., central processing unit (CPU), microcontroller, field programmable gate array (FPGA), application specific integrated circuit (ASIC), or any other software programmable processor) communicatively connected (e.g., via a wired and/or wireless data connection) to the SOFC stack 302, the PEM stack 304, the electric energy storage system 306, the DC/DC converters 308a-308c, the DC/AC inverter 310, the DC buses 312a-312c, and/or the combined DC bus 314. For example, one or more controllers 320 may be components of the hybrid fuel cell system 300 communicatively connected to and external to the SOFC stack 302, the PEM stack 304, the electric energy storage system 306, the DC/DC converters 308a-308c, and/or the DC/AC inverter 310. For another example, one or more controllers 320 may be components of the hybrid fuel cell system 300 communicatively connected to and integral to the DC/DC converters 308a-308c and/or the DC/AC inverter 310. The one or more controllers 320 may be configured to provide control signals to and/or directly control functions of the SOFC stack 302, the PEM stack 304, the electric energy storage system 306, the DC/DC converters 308a-308c, and/or the DC/AC inverter 310. The one or more controllers 320 may be configured to receive signals configured to indicate a DC voltage on the DC busses 312a-312c and/or combined DC bus 314 from the SOFC stack 302, the PEM stack 304, the electric energy storage system 306, the DC/DC converters 308a-308c, and/or the DC/AC inverter 310. The one or more controllers 320 may be configured to directly measure a DC voltage on the DC buses 312a-312c and/or combined DC bus 314 at the SOFC stack 302, the PEM stack 304, the electric energy storage system 306, the DC/DC converters 308a-308c, the DC/AC inverter 310, the DC bus 312a-312c, and/or the combined DC bus 314.

The SOFC stack 302 may be configured to provide DC electric energy to the DC/DC converter 308a via the DC bus 312a. The SOFC stack 302 may be sized and otherwise configured to provide a base level stack DC electric energy, which may be determined by a base level load demand for a load for which the hybrid fuel cell system 300 is deployed. The base level stack DC electric energy may be configured as an amount of DC voltage needed to support the base level load demand. Optionally, the amount of DC voltage output by the SOFC stack 302 may be controlled to be a constant amount of DC voltage, such as the base level stack DC electric energy. The amount of DC voltage output by the SOFC stack 302 may be controlled by a controller 320.

The DC/DC converter 308a may be configured to provide DC electric energy (e.g., DC power) to the DC/AC inverter 310 via the combined DC bus 314. The DC/DC converter 308a may be configured to provide a base level conditioned DC electric energy, which may be determined by the base level load demand for the load for which the hybrid fuel cell system 300 is deployed. The base level conditioned DC electric energy may be configured as an amount of DC voltage needed to support the base level load demand. The amount of DC voltage output by the DC/DC converter 308a may be controlled to be a constant amount of DC voltage, such as the base level conditioned DC electric energy. The amount of DC voltage output by the DC/DC converter 308a may be controlled by a controller 320.

The PEM stack 304 may be configured to provide DC electric energy (e.g., DC power) to the DC/DC converter 308b via the DC bus 312b. The PEM stack 304 may be sized and otherwise configured to provide a variable level stack DC electric energy, which may be determined by a variable level load demand for the load for which the hybrid fuel cell system 300 is deployed. The variable level load demand may be a level of load demand in addition to the base level load demand for the load for which the hybrid fuel cell system 300 is deployed. The variable level stack DC electric energy may be configured as an amount of DC voltage needed to support the variable level load demand. The amount of DC voltage output by the PEM stack 304 may be controlled as a variable amount of DC voltage, such as the variable level stack DC electric energy. The amount of DC voltage output by the PEM stack 304 may be controlled by a controller 320.

The DC/DC converter 308b may be configured to provide DC electric energy to the DC/AC inverter 310 via the combined DC bus 314. The DC/DC converter 308b may be configured to provide a variable level conditioned DC electric energy, which may be determined by a variable level load demand for the load for which the hybrid fuel cell system 300 is deployed. The variable level conditioned DC electric energy may be configured as an amount of DC voltage needed to support the variable level load demand. The amount of DC voltage output by the DC/DC converter 308b may be controlled as a variable amount of DC voltage, such as the variable level conditioned DC electric energy. The amount of DC voltage output by the DC/DC converter 308b may be controlled by a controller 320.

The DC/AC inverter 310 may be configured to provide AC electric energy (e.g., AC power) to the load. The DC/AC inverter 310 may be configured to provide AC electric energy to support a load demand for the load for which the hybrid fuel cell system 300 is deployed. The load demand may be of any level load demand, including, but not limited to the base level load demand and the variable level load demand. The DC/AC inverter 310 may draw DC electric energy from the combined DC bus 314 in relation to the load demand, convert the DC electric energy to AC electric energy, and provide the AC electric energy to the load that may be electrically connectable by an AC bus to the hybrid fuel cell system 300. The DC/AC inverter 310 may increase or decrease draw of DC electric energy from the combined DC bus 314 in response to a corresponding increase or decrease in the load demand. The load demand may be configured as a combination of the base level load demand and the variable level load demand. For example, in response to an increase of the load demand by an increase of the variable level load demand, the DC/AC inverter 310 may increase draw of DC electric energy from the combined DC bus 314. In response to a decrease of the load demand by a decrease of the variable level load demand, the DC/AC inverter 310 may decrease draw of DC electric energy from the combined DC bus 314. The amount of DC electric energy drawn by the DC/AC inverter 310 may be controlled by a controller 320.

The controller 320 may be configured to measure the DC voltage at the combined DC bus 314. For example, the controller 320 may receive signals from the DC/DC converters 308a, 308b and/or the DC/AC inverter 310 that are configured to indicate to the controller 320 the DC voltage at the combined DC bus 314. In another example, the controller 320 may measure the DC voltage directly at the combined DC bus 314. The controller 320 may compare the DC voltage at the combined DC bus 314 to a DC voltage threshold. For example, the DC voltage threshold may be a predetermined DC voltage target. When the DC voltage at the combined DC bus 314 falls short of the DC voltage threshold, the controller 320 may determine that there is insufficient DC voltage on the combined DC bus 314. A shortfall of DC voltage on the combined DC bus 314 may be caused by the load for which the hybrid fuel cell system 300 is deployed demanding an amount of AC electric energy greater than what may be provided by the base level stack DC electric energy from the SOFC stack 302 via the DC/DC converter 308a. As, such the variable level load demand may be included as a portion of the load demand. For example, the variable level load demand may increase causing increased draw of DC electric energy by the DC/AC inverter 310 and a decrease of DC voltage at the combined DC bus 314. The controller 320 may increase the DC voltage on the combined DC bus 314 to at least achieve the DC voltage threshold. The increased voltage on the combined DC bus 314 may be sufficient, in effect, to support the load demand. The controller 320 may signal to and/or directly control the DC/DC converter 308b to commence drawing DC electric energy from the PEM stack 304 via the DC bus 312b. The controller 320 may signal to and/or directly control the DC/DC converter 308b to draw an amount of DC electric energy so that the DC voltage on the combined DC bus 314 is sufficient to at least achieve the DC voltage threshold. The amount of DC electric energy drawn from the PEM stack 304 by the DC/DC converter 308b may be sufficient to make up for the shortfall of DC voltage on the combined DC bus 314 to at least achieve the DC voltage threshold. A such, in effect, the amount of DC electric energy drawn from the PEM stack 304 by the DC/DC converter 308b may be sufficient to support the variable level load demand portion of the load demand. If the PEM stack 304 is off, then it may be restarted in response to the controller 320 signal and/or in response to power draw by the DC/DC converter 308b. Since the PEM stack 304 may be restarted quicker than the SOFC stack 302, the PEM stack 304 may be used to quickly provide the additional DC electric energy (i.e., power) required to meet the DC voltage threshold, and, in effect, the load demand.

If the DC voltage at the combined DC bus 314 fall short of the DC voltage threshold while the DC/DC converter 308b draws DC electric energy from the PEM stack 304, then the controller 320 may determine that there is insufficient DC voltage on the combined DC bus 314. A shortfall of DC voltage on the combined DC bus 314 may be caused by the load demanding an amount AC electric energy greater than what is provided by the base level stack DC electric energy from the SOFC stack 302 via the DC/DC converter 308a and the variable level stack DC electric energy from the PEM stack 304 via the DC/DC converter 308b. The controller 320 may be configured to increase the DC voltage on the combined DC bus 314 to at least achieve the DC voltage threshold. The increased voltage on the combined DC bus 314 may be sufficient, in effect, to support the increase in the load demand, which may include an increase in the variable level load demand portion of the load demand. For example, the variable level load demand may increase causing increased draw of DC electric energy by the DC/AC inverter 310 and a decrease of DC voltage at the combined DC bus 314. The controller 320 may signal to and/or directly control the DC/DC converter 308b to increase drawing DC electric energy from the PEM stack 304 via the DC bus 312b. The controller 320 may signal to and/or directly control the DC/DC converter 308b to draw an amount of DC electric energy so that the DC voltage on the combined DC bus 314 is sufficient to at least achieve the DC voltage threshold. The amount of DC electric energy drawn from the PEM stack 304 by the DC/DC converter 308b, in effect, may be sufficient to support the variable level load demand portion of the load demand.

In contrast, if the DC voltage at the combined DC bus 314 exceeds the DC voltage threshold while the DC/DC converter 308b draws DC electric energy from the PEM stack 304, then the controller 320 may determine that there is excess DC voltage on the combined DC bus 314. An excess of DC voltage on the combined DC bus 314 may be caused by the load demanding an amount AC electric energy less than what is provided by the base level stack DC electric energy from the SOFC stack 302 via the DC/DC converter 308a and the variable level stack DC electric energy from the PEM stack 304 via the DC/DC converter 308b. The controller 320 may be configured to decrease the DC voltage on the combined DC bus 314 to achieve the DC voltage threshold. The decreased voltage on the combined DC bus 314 may be sufficient, in effect, to support the decreased load demand, which may include a decreased variable level load demand portion of the load demand. For example, the variable level load demand may decrease causing decreased draw of DC electric energy by the DC/AC inverter 310 and an increase of DC voltage at the combined DC bus 314. The controller 320 may signal to and/or directly control the DC/DC converter 308b to decrease and/or to stop drawing DC electric energy from the PEM stack 304 via the DC bus 312b. The controller 320 may signal to and/or directly control the DC/DC converter 308b to draw an amount of DC electric energy or to stop drawing DC electric energy so that the DC voltage on the combined DC bus 314 is sufficient to achieve the DC voltage threshold. The amount of DC electric energy drawn from the PEM stack 304 by the DC/DC converter 308b, in effect, may be sufficient to support the variable level load demand portion of the load demand. The variable level load demand may decrease to a level at which the load demand may be approximately equal to or less than the base level load demand, a result of which may be decreased draw of DC electric energy by the DC/AC inverter 310 from the combined DC bus 314 such that the DC voltage at the combined DC bus 314 may be approximately equal to or greater than the DC voltage threshold. At such a point, the controller 320 may signal to and/or directly control the DC/DC converter 308b to cease drawing DC electric energy from the PEM stack 304 via the DC bus 312*b*. At such a point, in effect, load demand may be supported by the base level stack DC electric energy from the SOFC stack 302 without the variable level stack DC electric energy from the PEM stack 304.

The optional electric energy storage system 306 may be configured to provide DC electric energy to the optional DC/DC converter 308*c* via the optional DC bus 312*c*. The optional electric energy storage system 306 may be sized and otherwise configured to provide a storage system DC electric energy, which may be configured to alter a quantity and/or quality of the AC electric energy provided to the load for which the hybrid fuel cell system 300 is deployed. The storage system DC electric energy may be configured to provide amount of DC voltage needed to alter a quantity and/or quality of the AC electric energy. For example, if the combination of electrical energy output by the SOFC stack 302 and the PEM stack 304 cannot meet the DC voltage threshold, then additional electrical energy (i.e., power) is provided from the storage system 306 to the inverter 310. Alternatively, if the SOFC stack 302 and/or the PEM stack 304 is taken off line (e.g., for servicing or due to lack of fuel), then electrical energy is provided from the storage system 306 to the inverter 310. The amount of DC voltage output by the electric energy storage system 306 may be controlled as an amount of DC voltage, such as the storage system DC electric energy. The amount of DC voltage output by the electric energy storage system 306 may be controlled by a controller 320.

The DC/DC converter 308*c* may be configured to provide the DC electric energy to the DC/AC inverter 310 via the combined DC bus 314. The DC/DC converter 308*c* may be configured to provide a storage system conditioned DC electric energy. The storage system conditioned DC electric energy may be configured as an amount of DC voltage needed to alter a quantity and/or quality of the AC electric energy. The amount of DC voltage output by the DC/DC converter 308*c* may be controlled as an amount of DC voltage, such as the storage system conditioned DC electric energy. The amount of DC voltage output by the DC/DC converter 308*c* may be controlled by a controller 320.

Figure 4A:
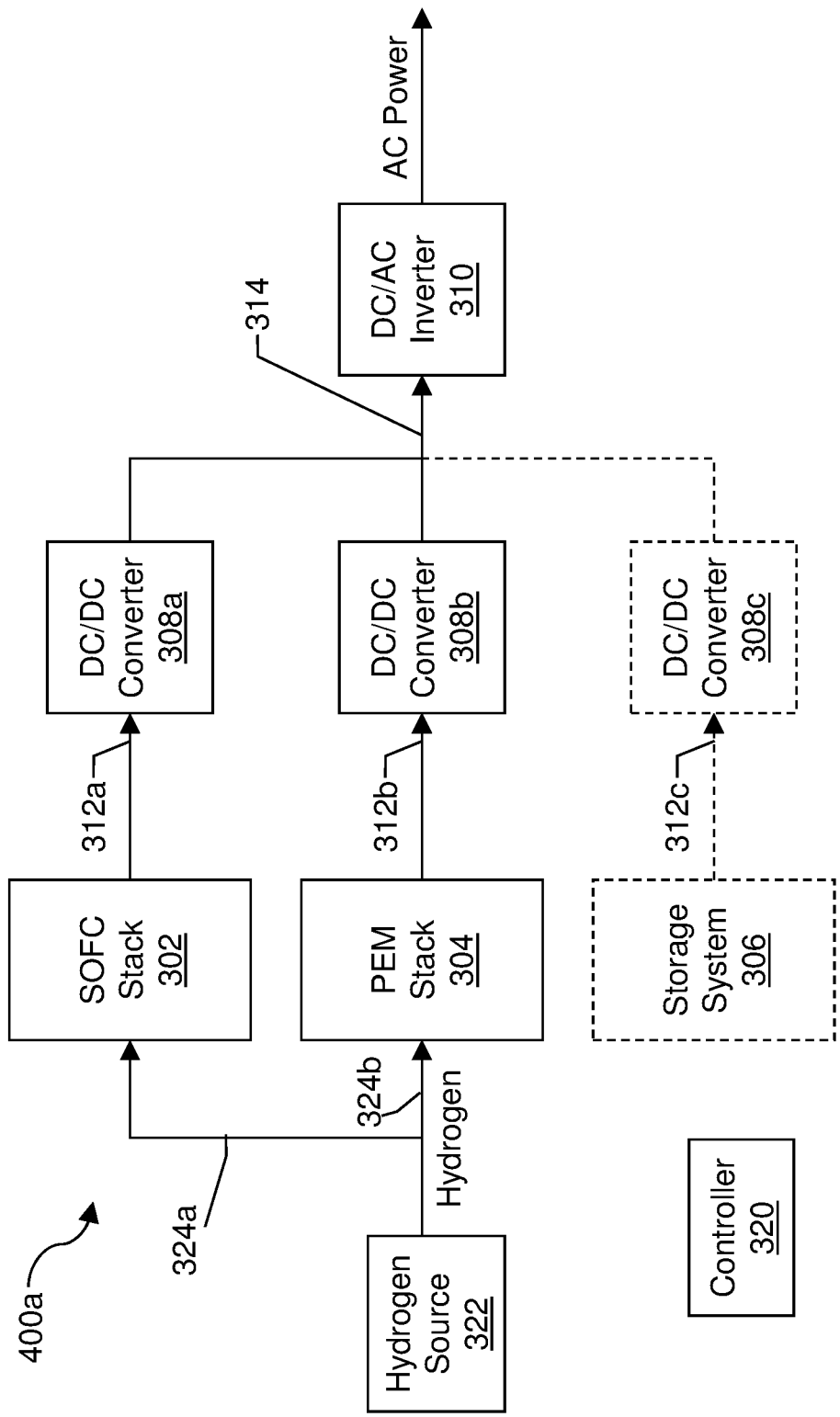
FIGS. 4A and 4B are component block diagrams of a hybrid fuel cell system using hydrogen fuel suitable for implementing various embodiments.
Figure 4B:
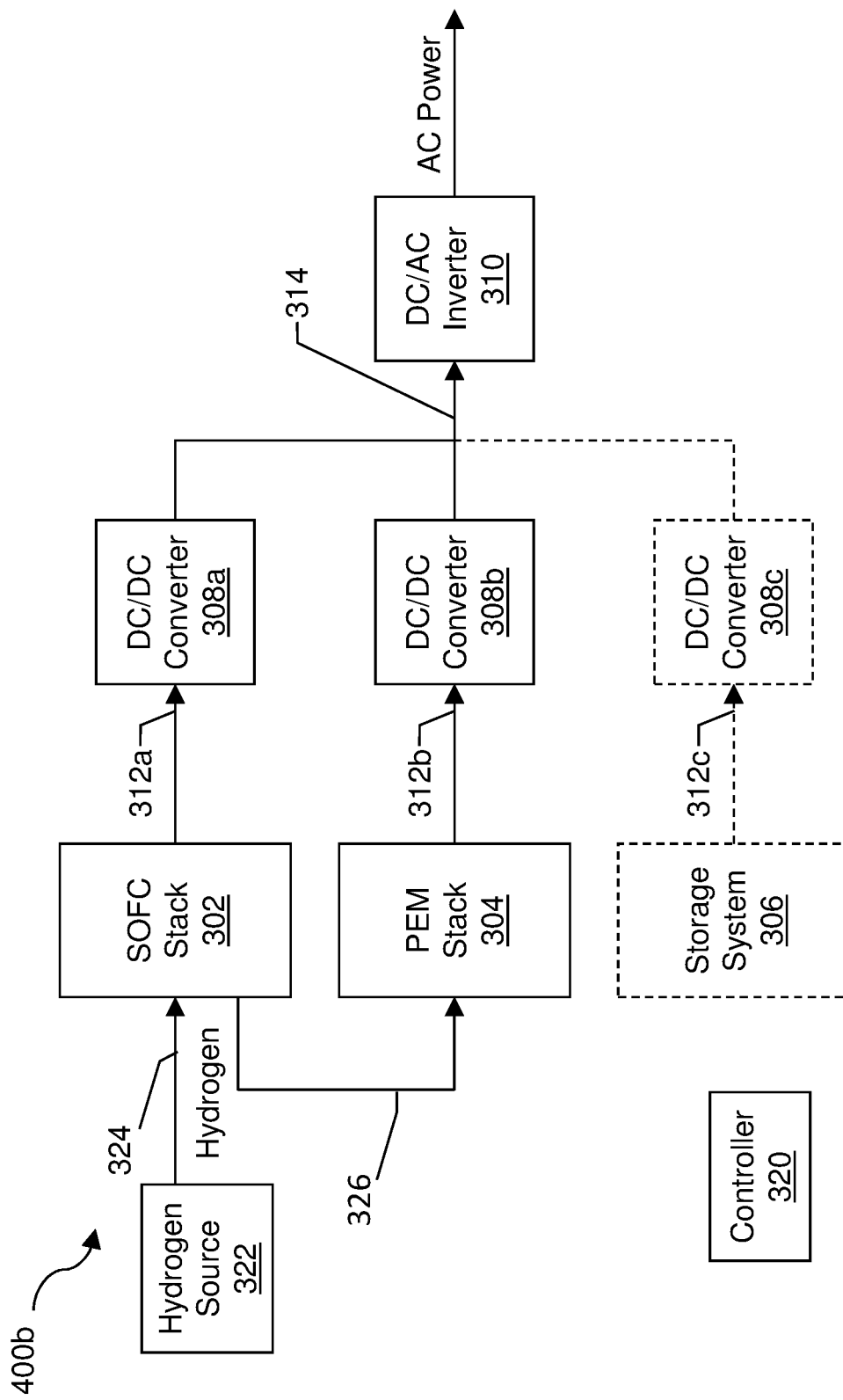

FIGS. 4A and 4B illustrate hybrid fuel cell systems 400*a*, 400*b* using hydrogen fuel suitable for implementing various embodiments. With reference to FIGS. 1-4B, the hybrid fuel cell systems 400*a*, 400*b* may include any number and combination of the components of the hybrid fuel cell system 300, as described with reference to FIG. 3, including the SOFC stack 302, the PEM stack 304, and various electric energy conditioning components, such as any number and combination of the DC/DC converters 308*a*, 308*b* and the DC/AC inverter 310. The SOFC stack 302 may be electrically connected to the DC/DC converter 308*a* via the DC bus 312*a*. The PEM stack 304 may be electrically connected to the DC/DC converter 308*b* via the DC bus 312*b*. The DC/DC converters 308*a*, 308*b* may be electrically connected to the DC/AC inverter 310 via the combined DC bus 314. The hybrid fuel cell systems 400*a*, 400*b* may optionally include the electric energy storage system 306 and various optional electric energy conditioning components, such as any number and combination of the DC/DC converter 308*c*. The electric energy storage system 306 may be electrically connected to the DC/DC converter 308*c* via the DC bus 312*c*. The DC/DC converter 308*c* may be electrically connected to the DC/AC inverter 310 via the combined DC bus 314. The hybrid fuel cell systems 400*a*, 400*b* may include any number and combination of the controllers 320 communicatively connected to the SOFC stack 302, the PEM stack 304, the electric energy storage system 306, the DC/DC converters 308*a*-308*c*, the DC/AC inverter 310, the DC buses 312*a*-312*c*, and/or the combined DC bus 314.

The hybrid fuel cell systems 400*a*, 400*b* may be fluidly connectable to one or more hydrogen fuel sources. Specifically, at least one of the SOFC stack 302 and/or the PEM stack 304 of hybrid fuel cell systems 400*a*, 400*b* may be fluidly connectable to one or more hydrogen fuel sources. For example, the SOFC stack 302 and the PEM stack 304 may be fluidly connected an external hydrogen fuel source 322, such as a hydrogen fuel storage vessel (e.g., hydrogen gas storage tank). The hydrogen fuel source may comprise hydrogen tanks (e.g., cylinders) filled at a hydrogen pumping station and then delivered to the power generation site, and/or may be filled at the power generation site by a hydrogen tanker truck. The SOFC stack 302 and the PEM stack 304 may receive hydrogen from the hydrogen fuel source 322 and use the hydrogen to generate the base level stack DC electric energy and the variable level stack DC electric energy. The SOFC stack 302 and the PEM stack 304 my receive, or intake, hydrogen from the fluidly connectable hydrogen fuel source at constant and/or variable rates. For example, the SOFC stack 302 may receive hydrogen from the fluidly connectable hydrogen fuel source at a constant rate, and the PEM stack 304 may receive hydrogen from the fluidly connectable hydrogen fuel source at a variable rate.

In one embodiment illustrated in FIG. 4A for the hybrid fuel cell system 400*a*, the SOFC stack 302 and the PEM stack 304 may separately fluidly connected to external hydrogen fuel source 322 via respective hydrogen fuel conduits (e.g., pipes, etc.) 324*a* and 324*b*.

In another embodiment illustrated in FIG. 4B for the hybrid fuel cell system 400*b*, the SOFC stack 302 may be fluidly connected to the external hydrogen fuel source 322 via the hydrogen fuel conduit 324. However, the PEM stack 304 is not directly connected to the external hydrogen fuel source 322. Instead, the fuel inlet of the PEM stack 304 is fluidly connected to the anode exhaust of the SOFC stack 302 via exhaust conduit 326 to receive hydrogen from the SOFC stack anode exhaust. The SOFC stack 302 may receive hydrogen as the fuel inlet stream at the anode electrodes and air at the cathode electrodes, and output a mixture of water and unused hydrogen as the anode exhaust stream from the anode electrodes. The anode exhaust stream is then provided as fuel to the fuel inlet of the PEM stack 304 via the exhaust conduit 326.

FIGS. 5A-5G illustrate a hybrid fuel cell system 500*a*-500*g* using a hydrocarbon fuel (e.g., natural gas, pure methane, pentane, biogas, etc.) suitable for implementing various embodiments. With reference to FIGS. 1-5G, the hybrid fuel cell system 500*a*-500*g* may include any number and combination of the components of the hybrid fuel cell system 300, as described with reference to FIG. 3, including the SOFC stack 302, the PEM stack 304, and various electric energy conditioning components, such as any number and combination of the DC/DC converters 308*a*, 308*b* and the DC/AC inverter 310. The SOFC stack 302 may be electrically connected to the DC/DC converter 308*a* via the DC bus 312*a*. The PEM stack 304 may be electrically connected to the DC/DC converter 308*b* via the DC bus 312*b*. The DC/DC converters 308*a*, 308*b* may be electrically connected to the DC/AC inverter 310 via the combined DC bus 314. The hybrid fuel cell system 500*a*-500*g* may optionally include the electric energy storage system 306 and various optional electric energy conditioning components, such as any number and combination of the DC/DC converter 308*c*. The electric energy storage system 306 may be electrically connected to the DC/DC converter 308*c* via the DC bus 312c. The DC/DC converter 308c may be electrically connected to the DC/AC inverter 310 via the combined DC bus 314. The hybrid fuel cell system 500a-500g may include any number and combination of the controllers 320 communicatively connected to the SOFC stack 302, the PEM stack 304, the electric energy storage system 306, the DC/DC converters 308a-308c, the DC/AC inverter 310, the DC buses 312a-312c, and/or the combined DC bus 314.

The hybrid fuel cell system 500a-500g may be fluidly connectable to one or more hydrocarbon fuel sources. Specifically, the SOFC stack 302 of hybrid fuel cell systems 500a-500g may be fluidly connected to one or more external hydrocarbon fuel sources 522 via a hydrocarbon fuel conduit 524, while the PEM stack is fluidly connected to the anode exhaust of the SOFC stack 302 and/or the external hydrogen fuel source 322. The hydrocarbon fuel source 522 may comprise a gas pipeline, such as a municipal natural gas line and/or a hydrocarbon fuel storage vessel, such as a gas or liquid fuel tank. The hydrocarbon fuel source 522 may provide a gas or liquid fuel, such as natural gas, methane, bio-gas, propane, etc. to the fuel inlet of the SOFC stack 302 via the hydrocarbon fuel conduit 524.

Figure 5A:
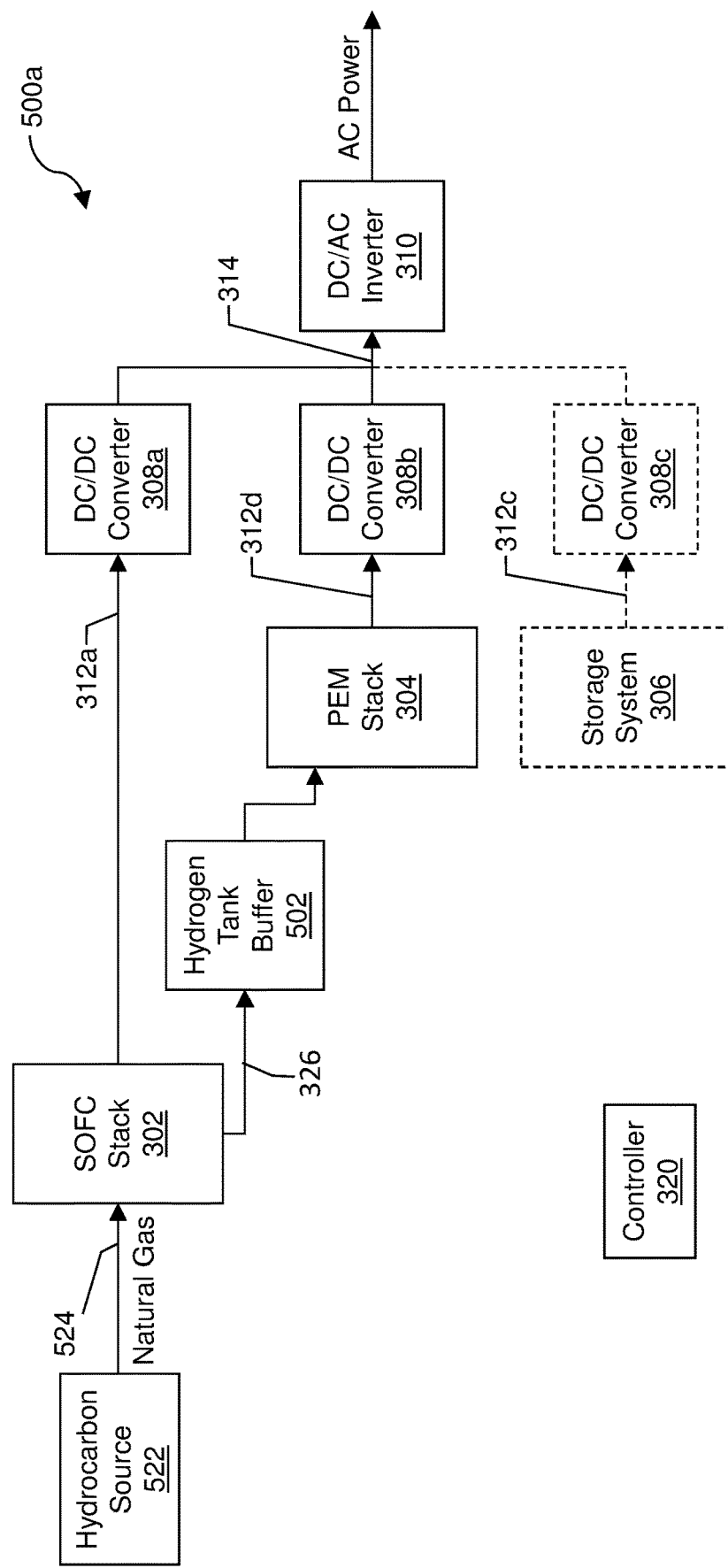
FIGS. 5A-5G are component block diagrams of a hybrid fuel cell system using hydrocarbon gas fuel suitable for implementing various embodiments.
Figure 5B:
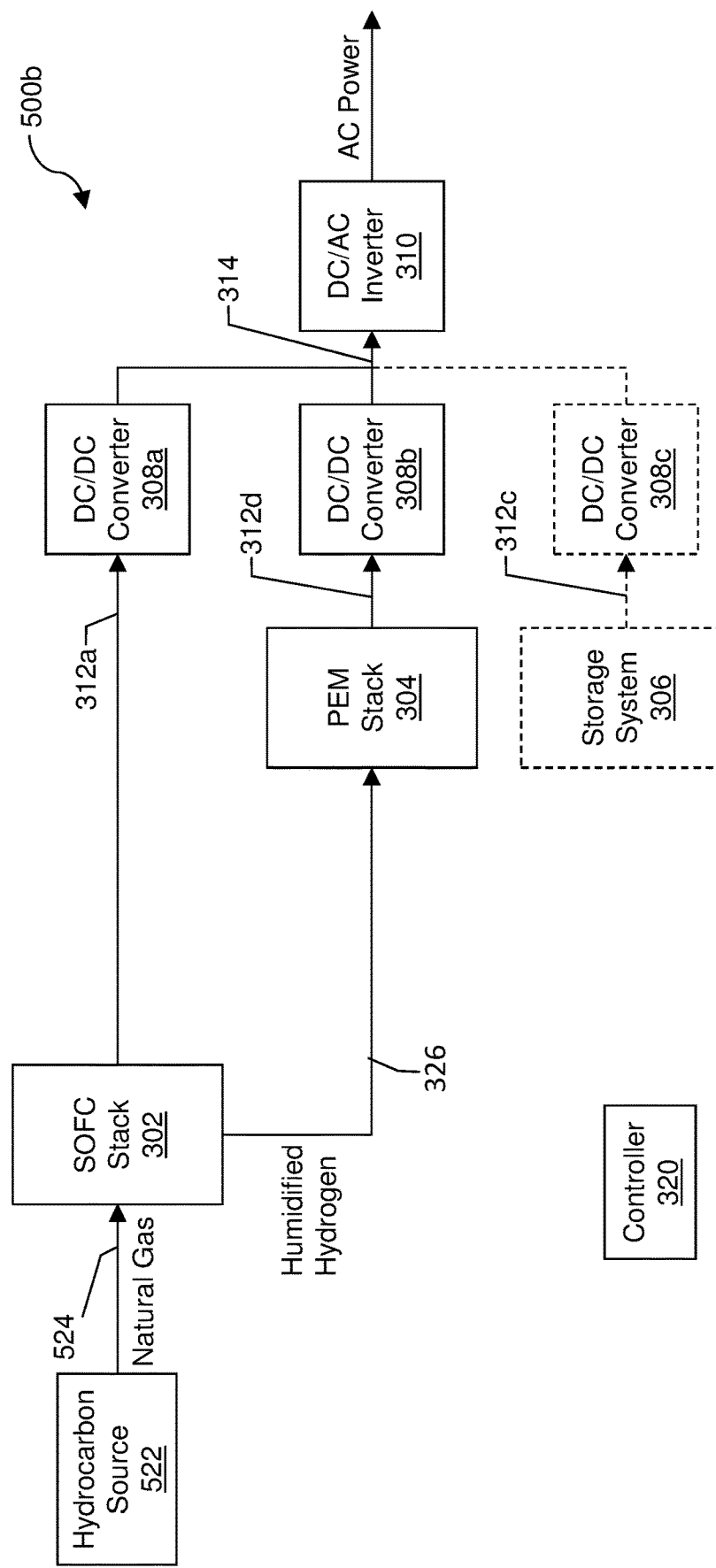
Figure 5C:
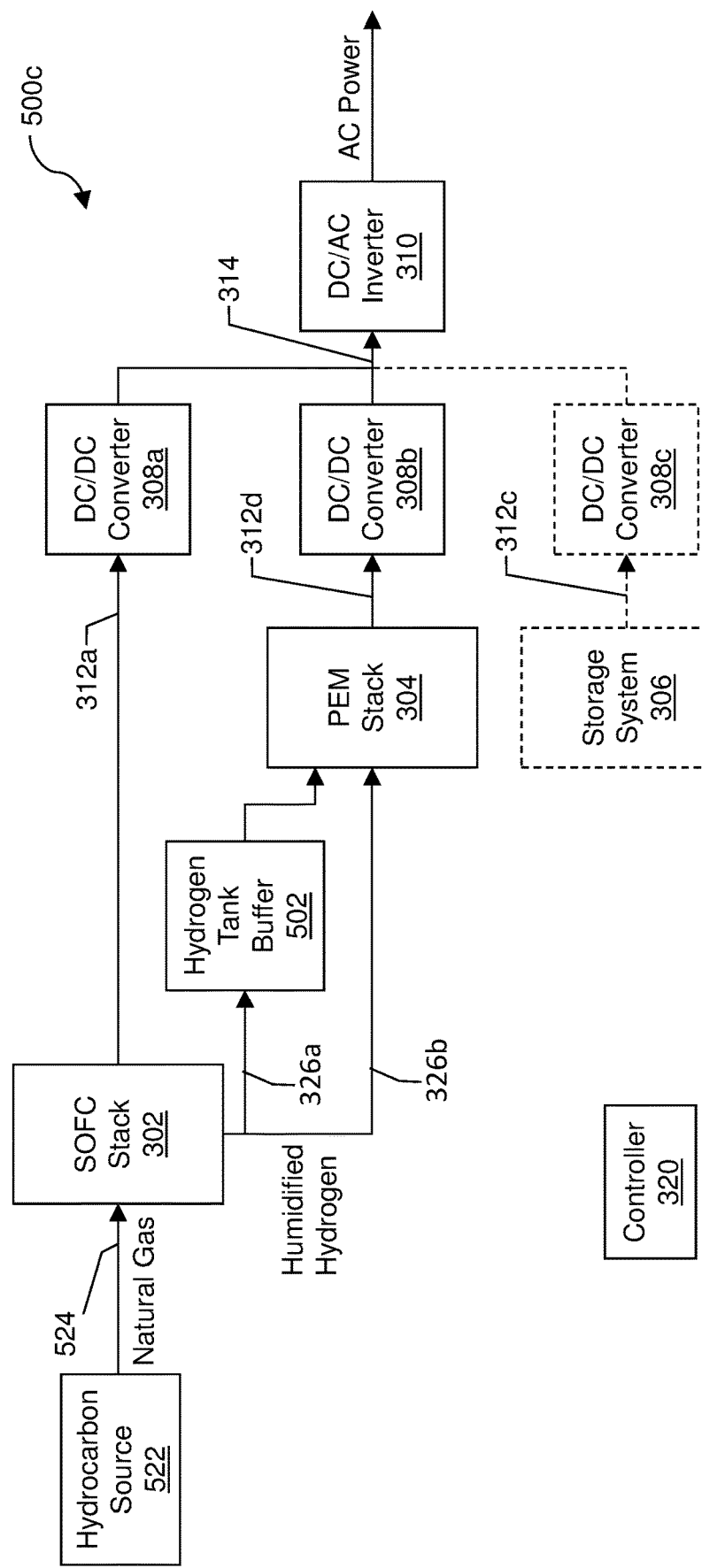
Figure 5D:
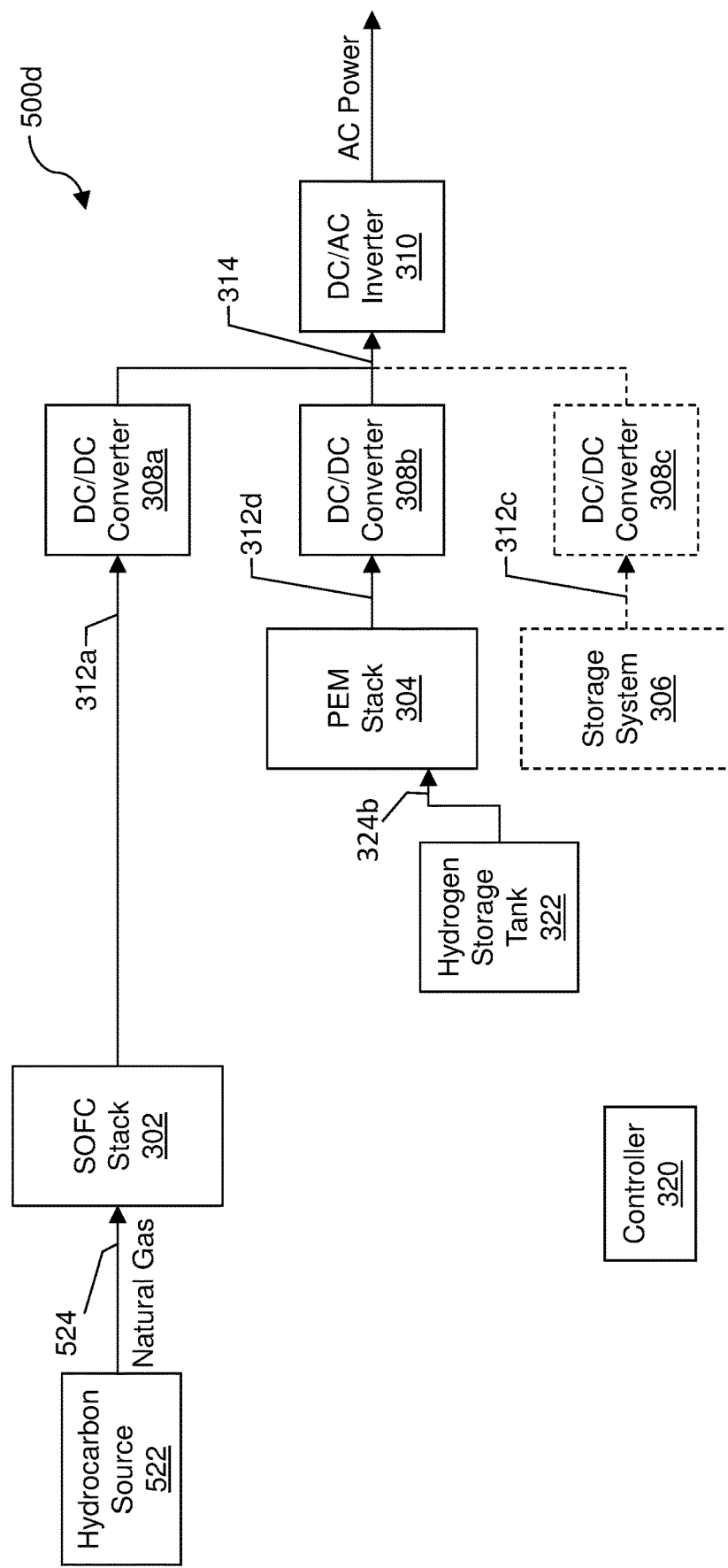
Figure 5E:
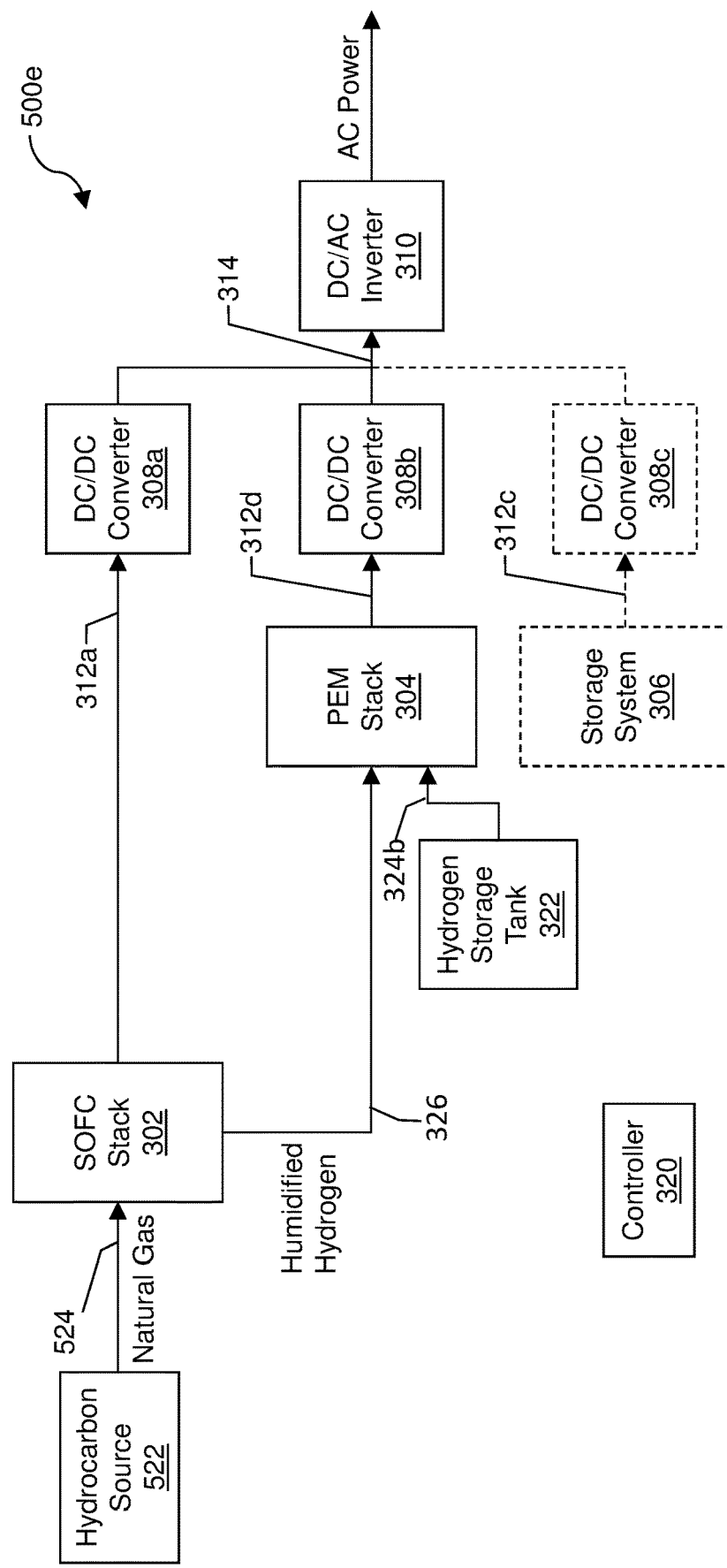
Figure 5F:
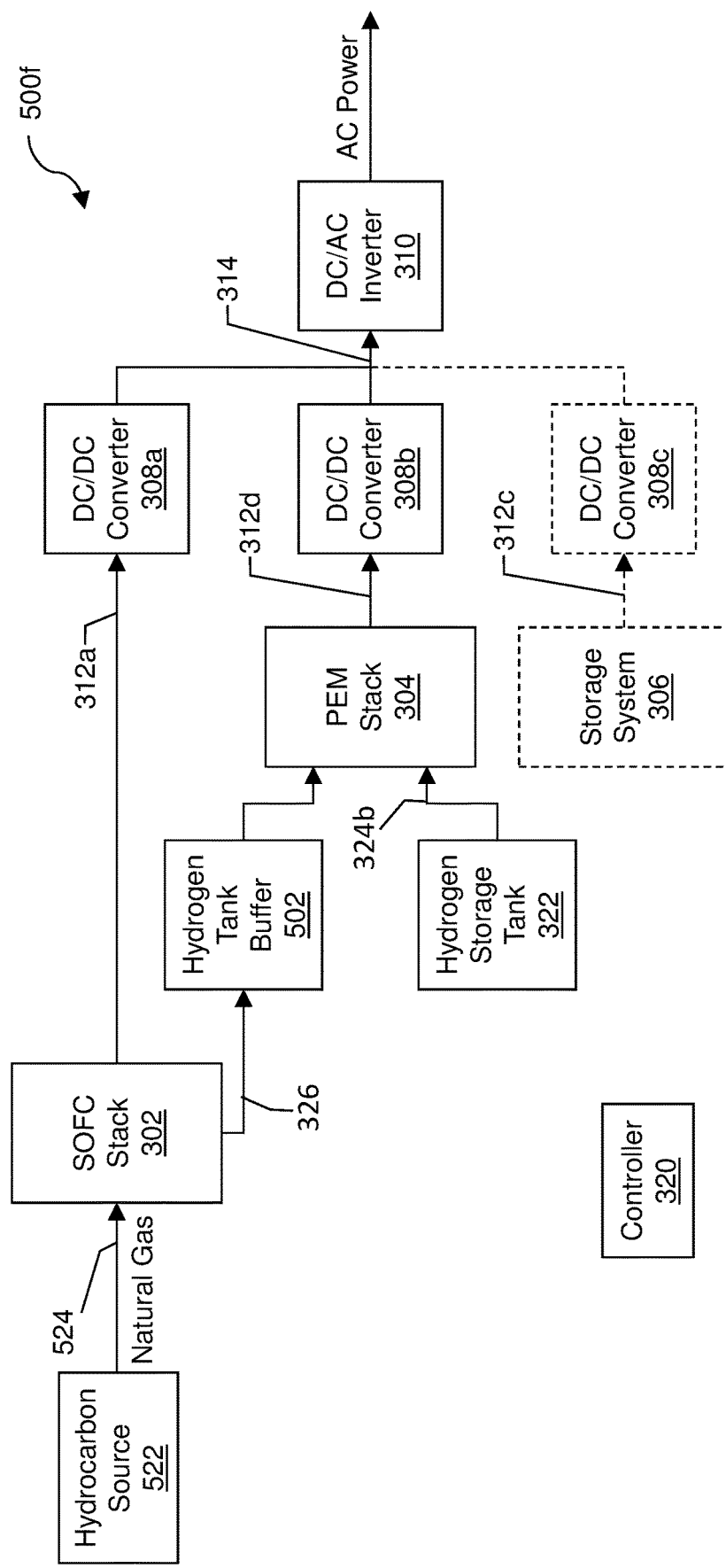
Figure 5G:
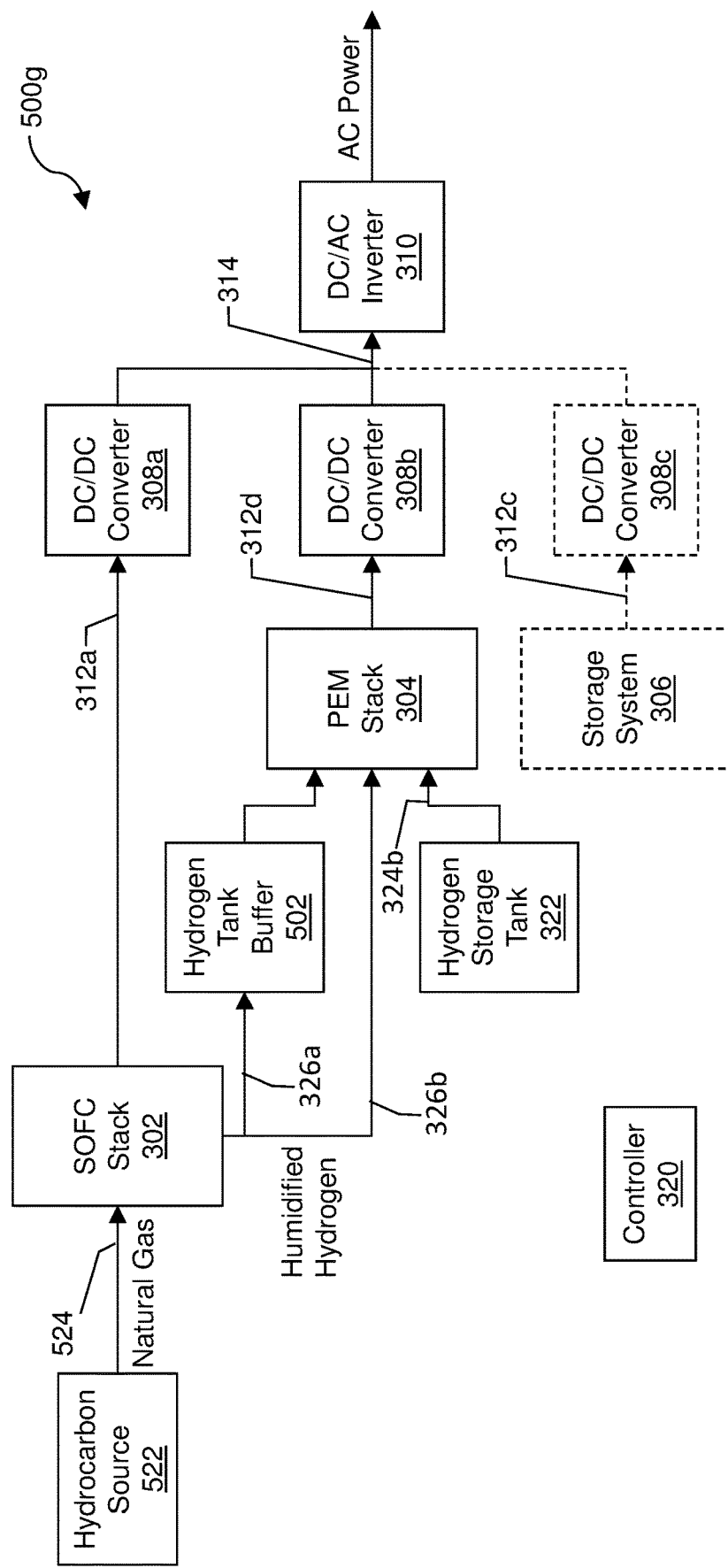

In the examples illustrated in FIGS. 5A-5C, the fuel inlet PEM stack 304 is fluidly connected to the anode exhaust of the SOFC stack 302. The SOFC anode exhaust may include a mixture of CO, $CO_2$, $H_2$, and $H_2O$ (and unused hydrocarbon fuel). Using a hydrogen pump, such as an electrochemical hydrogen pump (not shown), the hydrogen (and optionally water vapor) from SOFC anode exhaust may be separated from the mixture and used as a feed for the PEM stack 304. Based availability of hydrogen in the SOFC anode exhaust, approximately 30% to approximately 40% of a SOFC stack rating may be achieved in PEM stack 304.

In the example illustrated in FIG. 5A, the PEM stack 304 may receive hydrogen from the SOFC anode exhaust of the SOFC stack 302 via the exhaust conduit 326 and a hydrogen buffer tank 502 located on the exhaust conduit 326. The hydrogen may be temporarily stored in the hydrogen buffer tank 502 and then provided to the PEM stack 304 during the operation of the PEM stack. The water vapor (i.e., moisture) may be removed from the hydrogen stored in the hydrogen buffer tank 502.

In the example illustrated in FIG. 5B, the PEM stack 304 may receive hydrogen from the SOFC anode exhaust via the exhaust conduit 326 directly from the SOFC stack 302 without using the hydrogen buffer tank 502. The hydrogen pump may provide both hydrogen and water vapor (i.e., humidified hydrogen) from the anode exhaust of the SOFC stack 302 to the fuel inlet of the PEM stack 304.

In the example illustrated in FIG. 5C, the PEM stack 304 may receive hydrogen from the SOFC anode exhaust of the SOFC stack 302 via a first exhaust conduit 326a containing a hydrogen buffer tank 502 thereon, and directly from the SOFC stack 302 via a second exhaust conduit 326b. In this case, the hydrogen buffer tank 502 may supply additional hydrogen fuel required by the PEM stack 304 when the second exhaust conduit 326b cannot supply sufficient hydrogen fuel required by the PEM stack, while the second anode exhaust conduit 326b supplies humidified hydrogen fuel to the PEM stack 304.

In the examples illustrated in FIGS. 5D-5G, the PEM stack 304 is fluidly connected to an external hydrogen fuel source 322. In the example illustrated in FIG. 5D, the PEM stack 304 receives hydrogen from the hydrogen storage tank 322 via the hydrogen fuel conduit 324b. In this example, the PEM stack 304 is not fluidly connected to the anode exhaust of the SOFC stack 302. In the example illustrated in FIG. 5E, the PEM stack 304 may receive hydrogen from the SOFC anode exhaust of the SOFC stack 302 directly from the SOFC stack 302 via the anode exhaust conduit 326 and from the hydrogen storage tank 322 via the hydrogen fuel conduit 324b. In the example illustrated in FIG. 5F, the PEM stack 304 may receive hydrogen from the SOFC anode exhaust of the SOFC stack 302 via the hydrogen buffer tank 502 and conduit 326 and from the hydrogen storage tank 322 via conduit 324b. In the example illustrated in FIG. 5G, the PEM stack 304 may receive hydrogen from the SOFC anode exhaust of the SOFC stack 302 via the hydrogen buffer tank 502 and conduit 326a, from the SOFC anode exhaust directly from the SOFC stack 302 via conduit 326b, and from the hydrogen storage tank 322 via conduit 324b.

Figure 6:
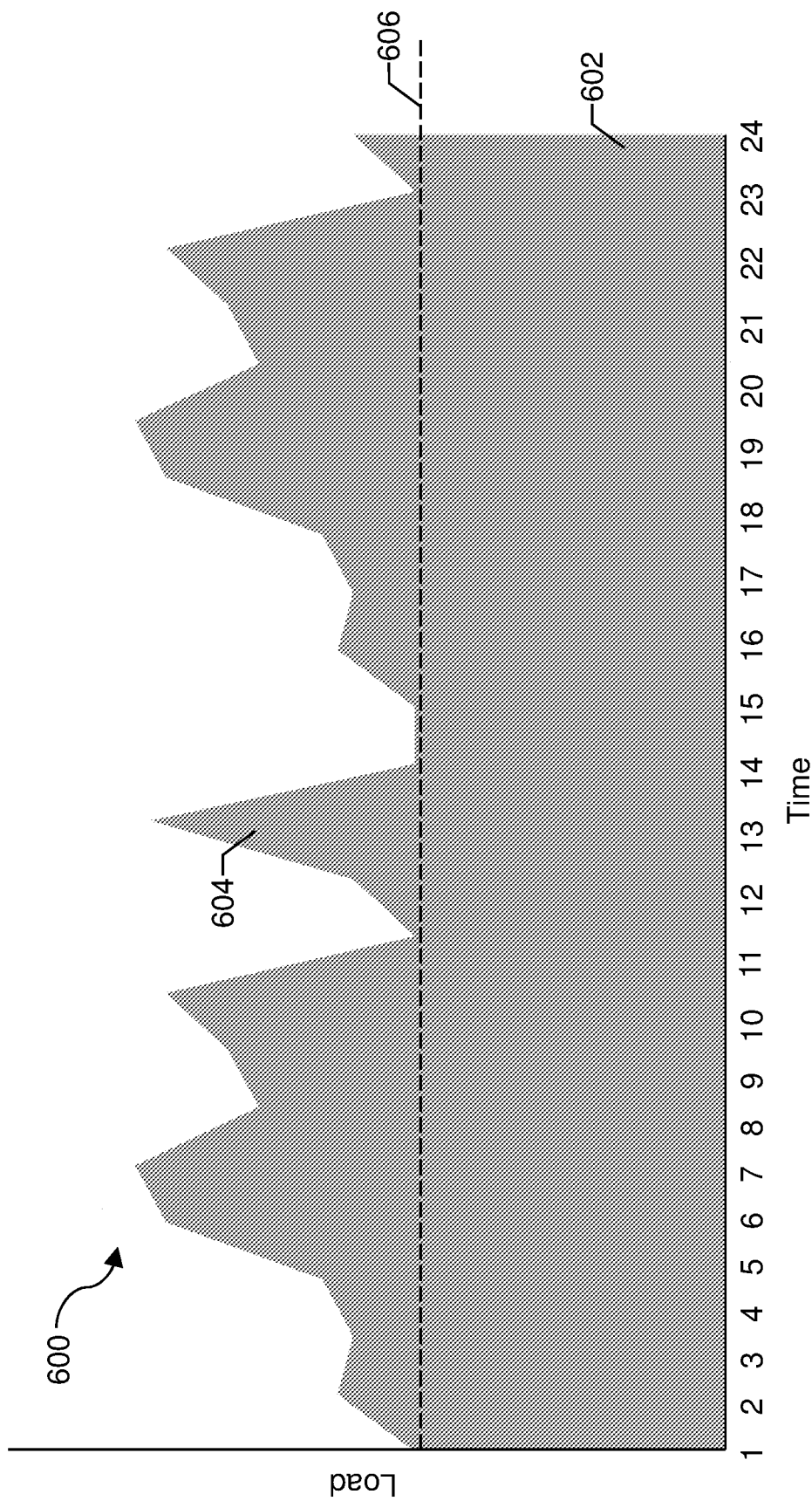
FIG. 6 is an example plot of load demand over time during load following of a grid independent, hybrid fuel cell system.

FIG. 6 illustrates an example plot 600 of load demand over time during load following of a grid independent, hybrid fuel cell system (e.g., hybrid fuel cell system 300, 400a, 400b, 500a-500g in FIGS. 3-5G). With reference to FIGS. 1-6, the hybrid fuel cell system may generate DC electric energy sufficient to at least achieve a DC voltage threshold on a DC bus (e.g., combined DC bus 314 in FIGS. 3-5G). The DC voltage threshold may be a predetermined DC voltage target. For example, the DC voltage threshold may be sufficient DC voltage to support a load demand of a load for which the hybrid fuel cell system is deployed. The load demand may include a base level load demand 602 portion, and the DC electric energy may include a base level stack DC electric energy generated by the SOFC stack 302 and a base level conditioned DC electric energy output by the DC/DC converter 302a that may be sufficient to support the base level load demand 602. The load demand may include a variable level load demand 604 portion, and the DC electric energy may include a variable level stack DC electric energy generated by the PEM stack 304 and a variable level conditioned DC electric energy output by the DC/DC converter 302b that may be sufficient to support the variable level load demand 604. The base level load demand 602 may be a portion of the load demand that falls short of or is equal to a load demand threshold 606. The variable level load demand 604 may be a portion of the load demand that exceeds the load demand threshold 606.

The SOFC stack 302 may generate a constant output of the base level stack DC electric energy and the DC/DC converter 302a may produce a constant output of the base level conditioned DC electric energy output that may be sufficient to at least achieve the DC voltage threshold. In effect, the base level conditioned DC electric energy may be sufficient to support the base level load demand 602. The PEM stack 304 may generate an output of the variable level stack DC electric energy and the DC/DC converter 302b may produce an output of the variable level conditioned DC electric energy output that may be sufficient to at least achieve the DC voltage threshold during presence of the variable level load demand 604. In effect, the variable level conditioned DC electric energy may be sufficient to support the variable level load demand 604. The variable level stack DC electric energy and/or the variable level conditioned DC electric energy vary over time to at least achieve the DC voltage threshold in correspondence with variations in the variable level load demand 604 over the same time.

The DC/AC inverter 310 may output the AC electric power inverted from the base level conditioned DC electric power to support the load demand. The DC/AC inverter 310 may also output the AC electric power inverted from the base level conditioned DC electric power and the variable level conditioned DC electric power to support the load demand when the load demand includes the variable level load demand 604 portion causing the load demand to exceed the load demand threshold 606. In some examples, the DC/AC inverter 310 may additionally output the AC electric power inverted from the base level conditioned DC electric power, the variable level conditioned DC electric power, and the storage system DC electric energy produced by the electric energy storage system 306 to support the load demand when the load demand includes the variable level load demand 604 portion causing the load demand to exceed the load demand threshold 606.

Figure 7:
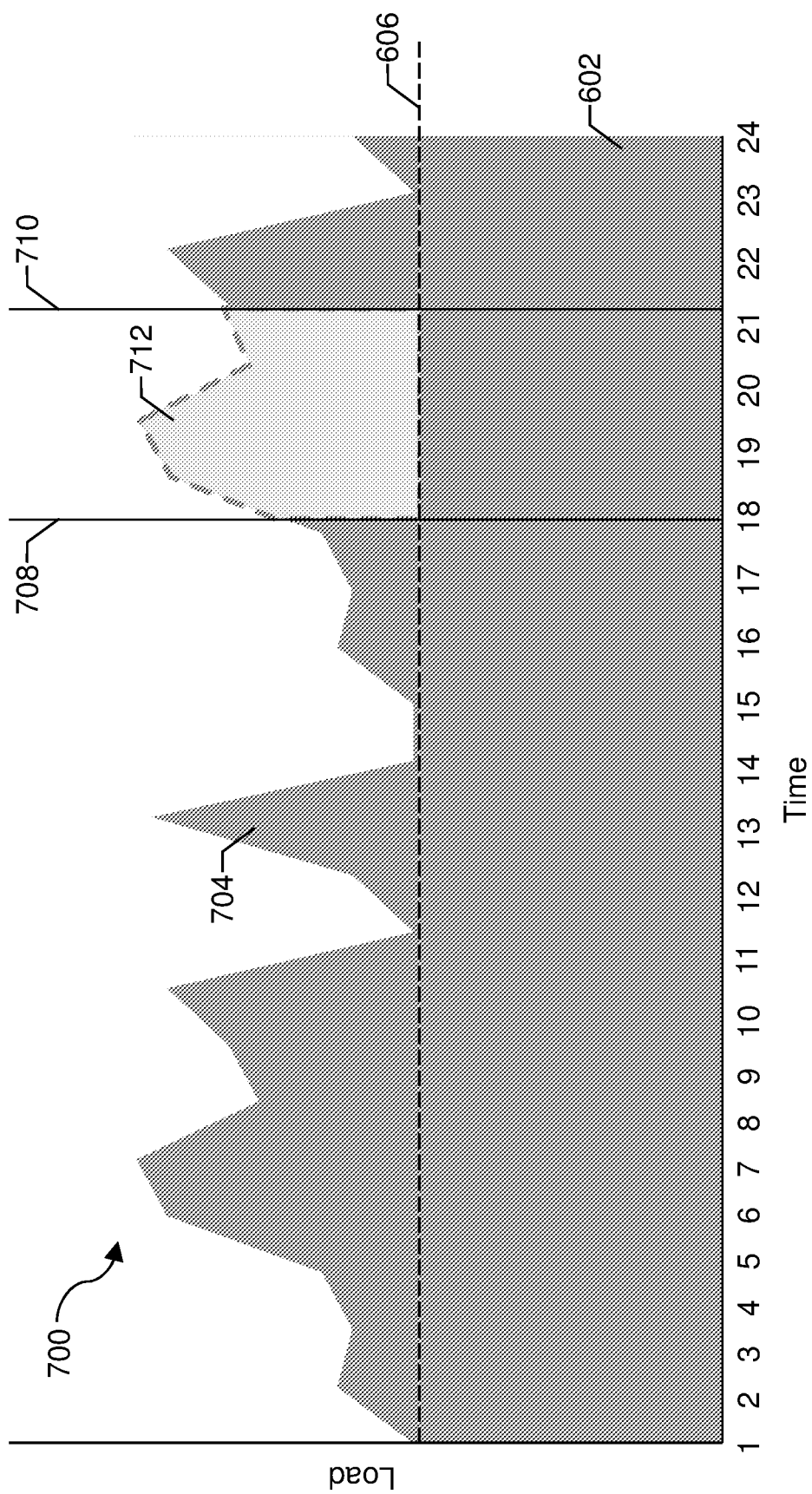
FIG. 7 is an example plot of load demand over time during load following of a microgrid backup, hybrid fuel cell system.

FIG. 7 illustrates an example plot 700 of load demand over time during load following of a microgrid backup, hybrid fuel cell system (e.g., hybrid fuel cell system 300, 400a, 400b, 500a-500g in FIGS. 3-5G). With reference to FIGS. 1-7, the hybrid fuel cell system may generate DC electric energy sufficient to at least achieve a DC voltage threshold on a DC bus (e.g., combined DC bus 314 in FIGS. 3-5G). The DC voltage threshold may be a predetermined DC voltage target. For example, the DC voltage threshold may be sufficient DC voltage to support a load demand of a load for which the hybrid fuel cell system is deployed. The load demand may include a base level load demand 602 portion, and the DC electric energy may include a base level stack DC electric energy generated by the SOFC stack 302 and a base level conditioned DC electric energy output by the DC/DC converter 302a that may be sufficient to at least achieve the DC voltage threshold. In effect, the base level conditioned DC electric energy may be sufficient to support the base level load demand 602, as described herein with reference to FIG. 6. The load demand may include a variable level load demand 704 portion, and an electric utility grid may provide AC electric energy sufficient to support the variable level load demand 704. The variable level load demand 704 may be a portion of the load demand that exceeds the load demand threshold 606.

However, in some instances, the electric utility grid may fail to provide AC electric energy sufficient to support the variable level load demand 704. For example, in a time period between a first time 708 and a second time 710, the electric utility grid may fail to provide AC electric energy sufficient to support a portion the variable level load demand 704. The variable level load demand portion that is not provided by the grid is shown as element 712 in FIG. 7. In this case, the PEM stack 304 is activated and used as a back-up power source, and the DC electric energy may include a variable level stack DC electric energy generated by the PEM stack 304 and a variable level conditioned DC electric energy output by the DC/DC converter 302b that may be sufficient to at least achieve the DC voltage threshold during presence of the variable level load demand portion 712. In effect, the variable level conditioned DC electric energy may be sufficient to support the variable level load demand portion 712. The variable level stack DC electric energy and/or the variable level conditioned DC electric energy vary over time to at least achieve the DC voltage threshold in correspondence with variations in the variable level load demand portion 712 over the same time. For example, the time may be the time period between the first time 708 and the second time 710 when the electric utility grid may fail to provide AC electric energy sufficient to support the variable level load demand portion 712.

The DC/AC inverter 310 may output the AC electric power inverted from the base level conditioned DC electric power to support the load demand. The DC/AC inverter 310 may also output the AC electric power inverted from the base level conditioned DC electric power and the variable level conditioned DC electric power to support the load demand when the load demand includes the variable level load demand portion 712 causing the load demand to exceed the load demand threshold 606. In some examples, the DC/AC inverter 310 may additionally output the AC electric power inverted from the base level conditioned DC electric power, the variable level conditioned DC electric power, and the storage system DC electric energy produced by the electric energy storage system 306 to support the load demand when the load demand includes the variable level load demand portion 712 causing the load demand to exceed the load demand threshold 606.

Figure 8:
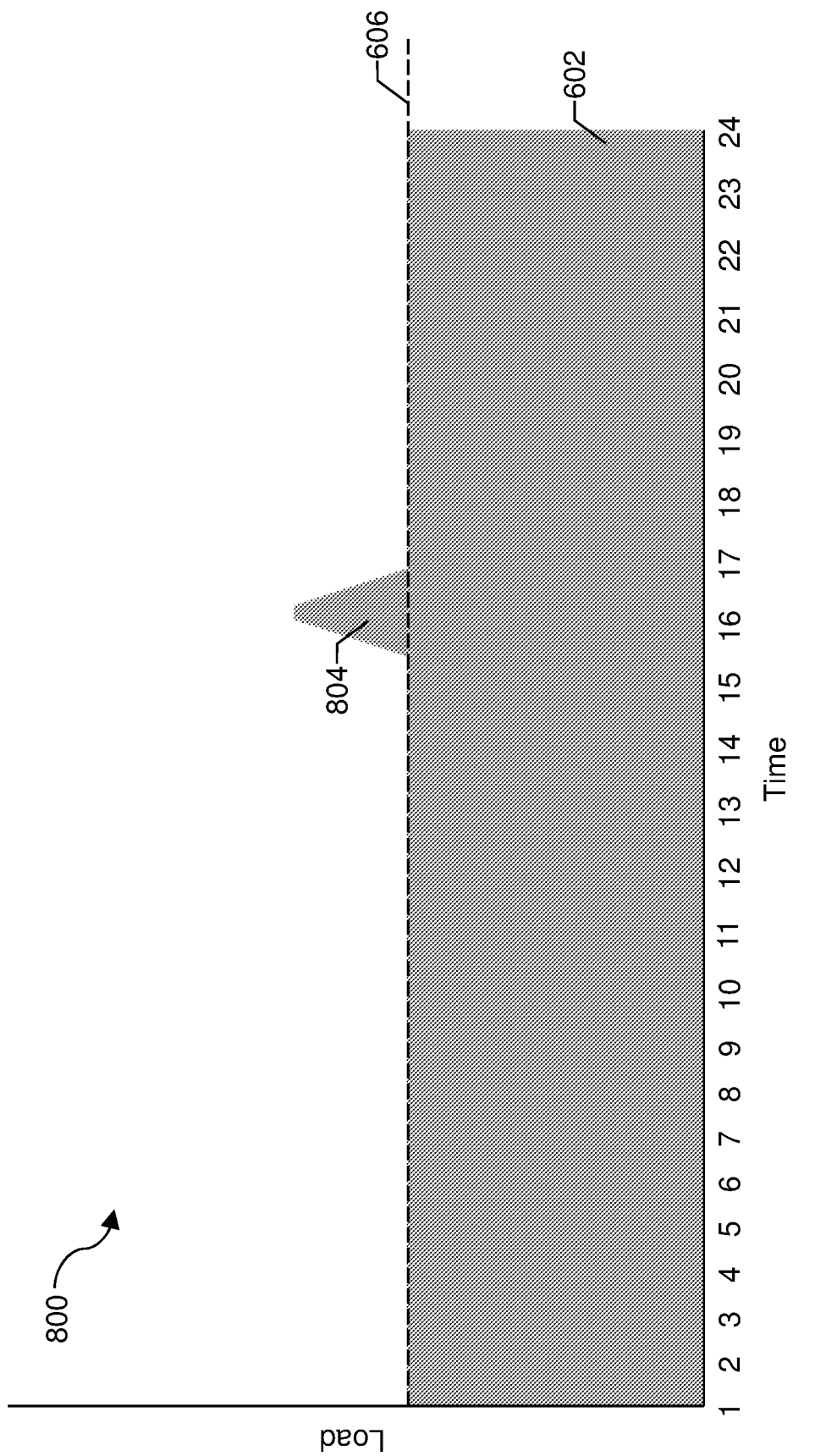
FIG. 8 is an example plot of load demand over time during load following of a microgrid backup, hybrid fuel cell system.

FIG. 8 illustrates an example plot 800 of load demand over time during load following of a microgrid backup, hybrid fuel cell system (e.g., hybrid fuel cell system 300, 400a, 400b, 500a-500g in FIGS. 3-5G). With reference to FIGS. 1-8, the hybrid fuel cell system may generate DC electric energy sufficient to at least achieve a DC voltage threshold on a DC bus (e.g., combined DC bus 314 in FIGS. 3-5G). The DC voltage threshold may be a predetermined DC voltage target. For example, the DC voltage threshold may be sufficient DC voltage to support a load demand of a load for which the hybrid fuel cell system is deployed. The load demand may include a base level load demand 602 portion, and the DC electric energy may include a base level stack DC electric energy generated by the SOFC stack 302 and a base level conditioned DC electric energy output by the DC/DC converter 302a that may be sufficient to at least achieve the DC voltage threshold. In effect, the base level conditioned DC electric energy may be sufficient to support the base level load demand 602, as described herein with reference to FIG. 6. The load demand may include a variable level load demand 804 portion, and the DC electric energy may include a variable level stack DC electric energy generated by the PEM stack 304 and a variable level conditioned DC electric energy output by the DC/DC converter 302b that may be sufficient to at least achieve the DC voltage threshold during presence of the variable level load demand 804. In effect, the variable level conditioned DC electric energy may be sufficient to support the variable level load demand 804. The variable level load demand 804 may be a portion of the load demand that exceeds the load demand threshold 606.

In some instances, the load demand may increase by an amount of the variable level load demand 804 due to a scheduled or event-based emergency system activation. A scheduled emergency system activation may be implemented, for example, for maintenance and testing. An event-based emergency system activation may be implemented, for example, based on an emergency criterion, such as detection of a fire to activate fire suppressing systems, loss of power due to a weather event to activate backup power systems, etc. The PEM stack 304 may generate an output of the variable level stack DC electric energy and the DC/DC converter 302b, which may produce an output of the variable level conditioned DC electric energy output that may be sufficient to at least achieve the DC voltage threshold during presence of the variable level load demand 804. In effect, the variable level conditioned DC electric energy may be sufficient to support the variable level load demand 804. The variable level stack DC electric energy and/or the variable level conditioned DC electric energy vary over time to at least achieve the DC voltage threshold in correspondence with variations in the variable level load demand 804 over the same time. For example, the variable level load demand 804 may quickly ramp up to power an emergency system or down in to deactivate the emergency system. For example, the variable level load demand 804 may variable or consistent between ramping up and ramping down for operation of the emergency system. An amount of time between ramping up and ramping down for operation of the emergency system may vary for different situations from seconds to weeks. Activation of the emergency system may trigger the load demand to exceed the load demand threshold 606, by an amount of the variable level load demand 804, may affect voltage on the DC bus causing the PEM stack 304 to generate the output of the variable level stack DC electric energy that may be sufficient to support to at least achieve the DC voltage threshold.

The DC/AC inverter 310 may output the AC electric power inverted from the base level conditioned DC electric power to support the load demand. The DC/AC inverter 310 may also output the AC electric power inverted from the base level conditioned DC electric power and the variable level conditioned DC electric power to support the load demand when the load demand includes the variable level load demand 804 causing the load demand to exceed the load demand threshold 606. In some examples, the DC/AC inverter 310 may additionally output the AC electric power inverted from the base level conditioned DC electric power, the variable level conditioned DC electric power, and the electric energy storage system DC electric energy produced by the electric energy storage system 306 to support the load demand when the load demand includes the variable level load demand 804 causing the load demand to exceed the load demand threshold 606.

Figure 9:
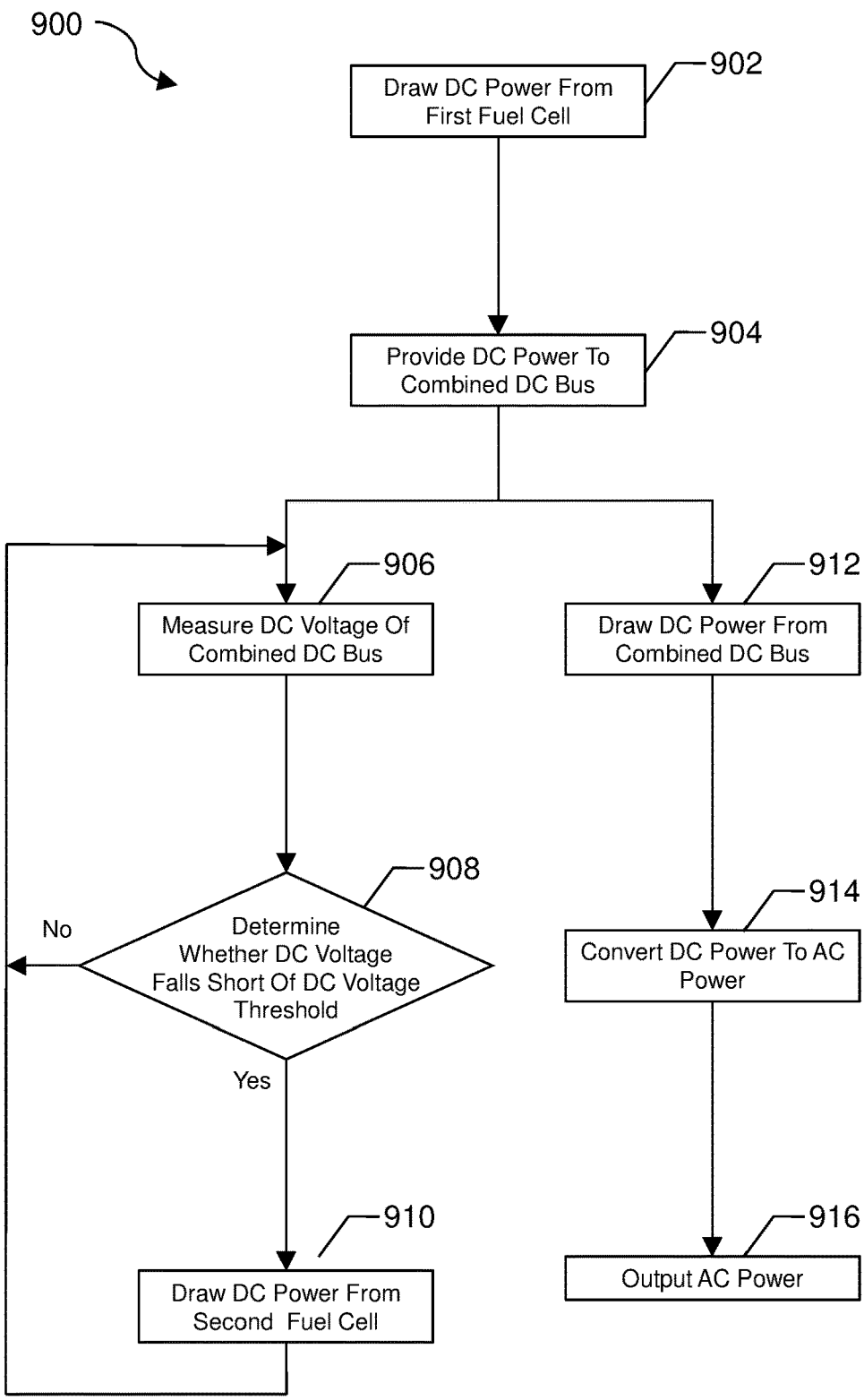
FIG. 9 is a process flow diagram of a method for hybrid fuel cell system load following and backup according to various embodiments.

FIG. 9 is a process flow diagram of a method for hybrid fuel cell system load following and backup according to various embodiments. With reference to FIGS. 1-9, the method 900 may be implemented using one or more controllers 320 configured to receive signals from any number or combination of the SOFC stack 302, the PEM stack 304, the electric energy storage system 306, the DC/DC converters 308a-308c, the DC/AC inverter 310, the DC bus 312a-312c, and/or combined DC bus 314. The method 900 may be implemented using the one or more controllers 320 configured to send control signals to any number and combination of the SOFC stack 302, the PEM stack 304, the electric energy storage system 306, the DC/DC converters 308a-308c, and/or the DC/AC inverter 310. In order to encompass the alternative configurations, the hardware implementing the method 900 is referred to herein as a "control device." Any number and combination of blocks 902-916 may be implemented periodically, repeatedly, or continuously, and/or concurrently with any other of blocks 902-916.

In block 902, the control device may draw DC electric energy from a first fuel cell (e.g., SOFC stack 302 in FIGS. 3-5G) of a fuel hybrid fuel cell system (e.g., hybrid fuel cell system 300, 400a, 400b, 500a-500g in FIGS. 3-5G). The control device may provide a signal to the first fuel cell and/or to a first DC/DC converter (e.g., DC/DC converter 302a in FIGS. 3-5G) that is configured to indicate an amount (e.g., set point) of a base level stack DC electric energy to output and/or draw. The control device may directly control functions of the first fuel cell and/or of the first DC/DC converter to output and/or draw the base level stack DC electric energy. The base level stack DC electric energy may be predetermined, such as based on a base level load demand of a load for which the hybrid fuel cell system is deployed.

In block 904, the control device may provide DC electric energy (i.e., power) to a combined DC bus (e.g., combined DC bus 314 in FIGS. 3-5G). The control device may provide a signal to the first DC/DC converter (e.g., DC/DC converter 302a in FIGS. 3-5G) that is configured to indicate an amount (e.g., set point) of a base level conditioned DC electric energy to output to the combined DC bus. The control device may directly control functions of the first DC/DC converter to output the base level conditioned DC electric energy. The base level conditioned DC electric energy may be predetermined, such as based on the base level load demand of the load for which the hybrid fuel cell system (e.g., hybrid fuel cell system 300, 400a, 400b, 500a-500g in FIGS. 3-5G) is deployed.

In block 906, the control device may measure a DC voltage of the combined DC bus (e.g., combined DC bus 314 in FIGS. 3-5G). The control device may receive signals configured to indicate to the control device the DC voltage on the combined DC bus from a DC/DC converter (e.g., DC/DC converters 308a-308c in FIGS. 3-5G), and/or a DC/AC inverter (e.g., DC/AC inverter 310 in FIGS. 3-5G). The control device may be configured to directly measure the DC voltage on the combined DC bus at the DC/DC converter, the DC/AC inverter, and/or the combined DC bus.

In determination block 908, the control device may determine whether the DC voltage falls short of a DC voltage threshold. The DC voltage threshold may represent the DC voltage threshold at the combined DC bus (e.g., combined DC bus 314 in FIGS. 3-5G). The DC voltage threshold may be a predetermined DC voltage target. For example, the DC voltage threshold may be based on a voltage sufficient for the load for which the hybrid fuel cell system (e.g., hybrid fuel cell system 300, 400a, 400b, 500a-500g in FIGS. 3-5G) is deployed. The control device may compare the DC voltage measured in block 906 to the DC voltage threshold. In response to determining that the DC voltage does not fall short of the DC voltage threshold (i.e., determination block 908="No"), the control device may measure the DC voltage of the combined DC bus in block 906.

In response to determining that the DC voltage does fall short of the DC voltage threshold (i.e., determination block 908="Yes"), the control device may a draw DC electric energy from the second fuel cell (e.g., PEM stack 304 in FIGS. 3-5G) in block 910. Managing draw of DC electric energy from the second fuel cell is described further for the method 1000 with reference to FIG. 10. The control device may repeat measuring the DC voltage of the combined DC bus in block 906.

In the alternative embodiment described above with respect to FIG. 7, the control device may also determine if the utility grid power is unavailable before drawing the DC power from the second fuel cell. In the alternative embodiment described above with respect to FIG. 8, the control device may also determine if the emergency (e.g., grid failure or maintenance requirement) has occurred before drawing the DC power from the second fuel cell.

In block 912, the control device may draw DC electric energy from the combined DC bus (e.g., combined DC bus 314 in FIGS. 3-5G). The control device may provide a signal to a DC/AC inverter (e.g., DC/AC inverter 310 in FIGS. 3-5G) that is configured to indicate an amount (e.g., set point) of DC electric energy to draw from the combined DC bus. The control device may directly control functions of the DC/AC inverter to draw the DC electric energy. The amount of DC electric energy may be based on the base level load demand and/or a variable level load demand of the load for which the hybrid fuel cell system (e.g., hybrid fuel cell system 300, 400a, 400b, 500a-500g in FIGS. 3-5G) is deployed.

In block 914, the control device may convert the DC electric energy to AC electric energy. The control device may provide a signal to the DC/AC inverter (e.g., DC/AC inverter 310 in FIGS. 3-5G) that is configured to indicate parameters for converting the of DC electric energy to AC electric energy. The control device may directly control functions of the DC/AC inverter to convert the DC electric energy to AC electric energy. For example, the control device may indicate or control characteristics of the AC electric energy, such as voltage, current, power, etc. The characteristics of the AC electric energy may be based on the load for which the hybrid fuel cell system (e.g., hybrid fuel cell system 300, 400a, 400b, 500a-500g in FIGS. 3-5G) is deployed, including the base level load demand and/or the variable level load demand. In block 916, the control device may output the AC electric energy. The AC electric energy may be output to an AC bus electrically connectable to the hybrid fuel cell system (e.g., hybrid fuel cell system 300, 400a, 400b, 500a-500g in FIGS. 3-5G) and to the load for which the hybrid fuel cell system is deployed.

Figure 10:
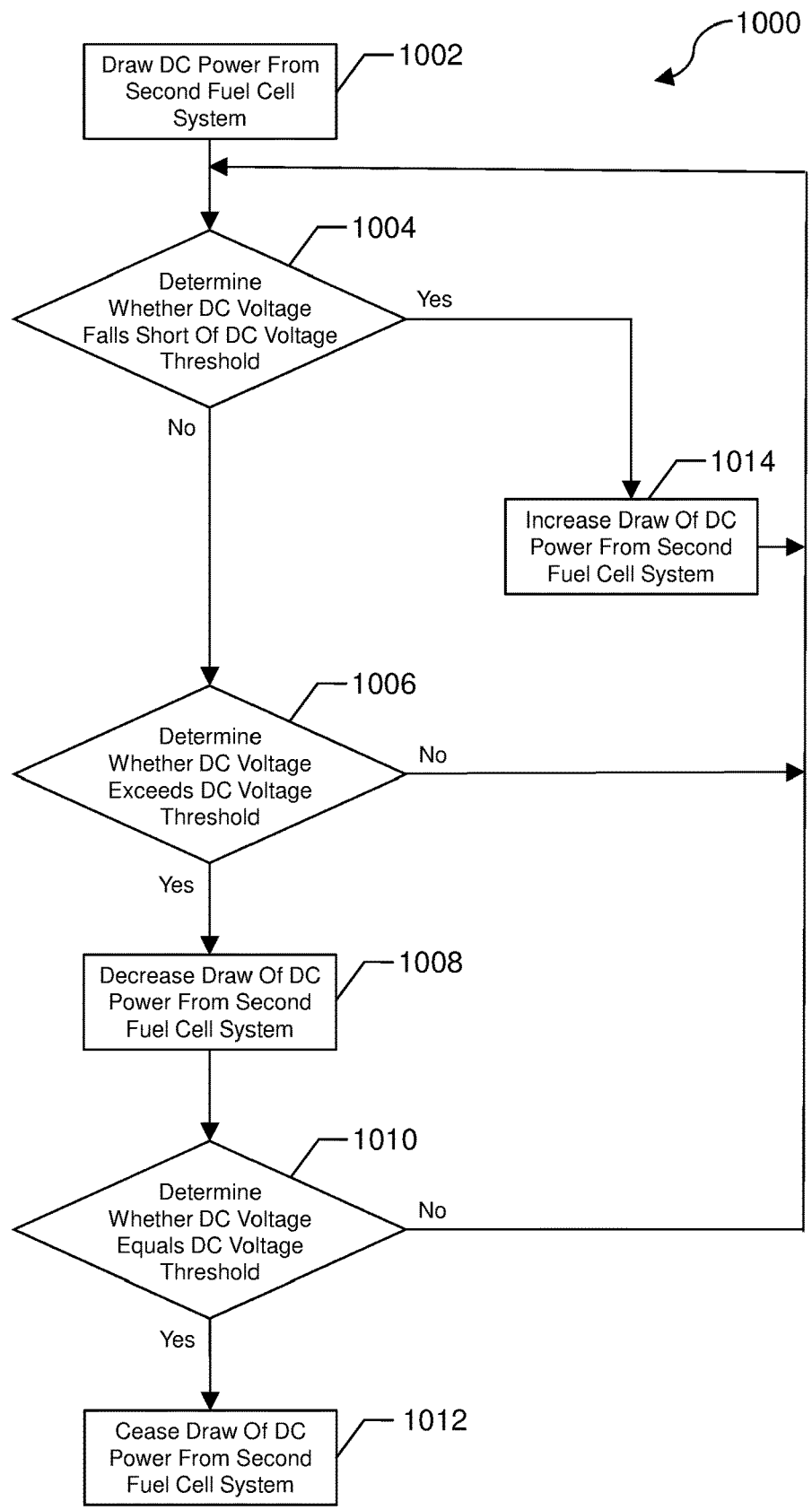
FIG. 10 is a process flow diagram of a method for hybrid fuel cell system load following and backup according to various embodiments.

FIG. 10 is a process flow diagram of a method for hybrid fuel cell system load following and backup according to various embodiments.

Block 1002 in FIG. 10 corresponds to block 910 in FIG. 9 in which the control device may draw DC electric energy from a second fuel cell (e.g., PEM stack 304 in FIGS. 3-5G) of the fuel hybrid fuel cell system (e.g., hybrid fuel cell system 300, 400a, 400b, 500a-500g in FIGS. 3-5G). The control device may provide a signal to the second fuel cell and/or to a second DC/DC converter (e.g., DC/DC converter 302b in FIGS. 3-5G) that is configured to indicate an amount (e.g., set point) of a variable level stack DC electric energy to output and/or draw. The control device may directly control functions of the second fuel cell and/or of the second DC/DC converter to output and/or draw the variable level stack DC electric energy. The variable level stack DC electric energy may be determined based on the comparison of the comparison of the DC voltage measured in block 906 to the DC voltage threshold. For example, the variable level stack DC electric energy may be determined to be a difference between the DC voltage measured in block 906 to the DC voltage threshold.

In determination block 1004, the control device may determine whether the DC voltage falls short of the DC voltage threshold. The DC voltage threshold may represent the DC voltage threshold at the combined DC bus (e.g., combined DC bus 314 in FIGS. 3-5G). The DC voltage threshold may be a predetermined DC voltage target. For example, the DC voltage threshold may be based on a voltage sufficient for the load for which the hybrid fuel cell system (e.g., hybrid fuel cell system 300, 400a, 400b, 500a-500g in FIGS. 3-5G) is deployed. The control device may compare the DC voltage measured in block 906 of the method 900 described with reference to FIG. 9 to the DC voltage threshold. Block 906 may be implemented periodically, repeatedly, or continuously, and/or concurrently with any number and combination of blocks 1002-1014, making updated DC voltage measurements available to the control device at determination block 1004.

In response to determining that the DC voltage does fall short of the DC voltage threshold (i.e., determination block 1004="Yes"), the control device may increase draw of DC electric energy from the second fuel cell (e.g., PEM stack 304 in FIGS. 3-5G) of the fuel hybrid fuel cell system (e.g., hybrid fuel cell system 300, 400a, 400b, 500a-500g in FIGS. 3-5G) in block 1014. The control device may provide a signal to the second fuel cell and/or to the second DC/DC converter (e.g., DC/DC converter 302b in FIGS. 3-5G) that is configured to indicate an amount (e.g., set point) to increase the variable level stack DC electric energy to output and/or draw. The control device may directly control functions of the second fuel cell and/or of the second DC/DC converter to output and/or draw the increased variable level stack DC electric energy. The increase of the variable level stack DC electric energy may be determined, such as based on the comparison of the comparison of the DC voltage measured in block 906 to the DC voltage threshold. For example, the variable level stack DC electric energy may be determined to be a difference between the DC voltage measured in block 906 to the DC voltage threshold. The increase of the variable level stack DC electric energy may be predetermined, such as a preset amount for which repeated increases may be implemented for the DC voltage to not fall short of the DC voltage threshold. The control device may repeat determining whether the DC voltage falls short of a DC voltage threshold in determination block 1004.

In response to determining that the DC voltage does not fall short of the DC voltage threshold (i.e., determination block 1004="No"), the control device may determine whether the DC voltage exceeds the DC voltage threshold in determination block 1006. The control device may compare the DC voltage measured in block 906 of the method 900 described with reference to FIG. 9 to the DC voltage threshold. Block 906 may be implemented periodically, repeatedly, or continuously, and/or concurrently with any number and combination of blocks 1002-1014, making updated DC voltage measurements available to the control device at determination block 1006. In response to determining that the DC voltage does not exceed the DC voltage threshold (i.e., determination block 1006="No"), the control device may repeat determining whether the DC voltage falls short of a DC voltage threshold in determination block 1004.

In response to determining that the DC voltage does exceed the DC voltage threshold (i.e., determination block 1006="Yes"), the control device may decrease draw of DC electric energy from the second fuel cell (e.g., PEM stack 304 in FIGS. 3-5G) of the fuel hybrid fuel cell system (e.g., hybrid fuel cell system 300, 400a, 400b, 500a-500g in FIGS. 3-5G) in block 1008. The control device may provide a signal to the second fuel cell and/or to the second DC/DC converter (e.g., DC/DC converter 302b in FIGS. 3-5G) that is configured to indicate an amount (e.g., set point) to decrease the variable level stack DC electric energy to output and/or draw. The control device may directly control functions of the second fuel cell and/or of the second DC/DC converter to output and/or draw the decreased variable level stack DC electric energy. The decrease of the variable level stack DC electric energy may be determined, such as based on the comparison of the comparison of the DC voltage measured in block 906 to the DC voltage threshold. For example, the decrease of the variable level stack DC electric energy may be determined to be a difference between the DC voltage measured in block 906 to the DC voltage threshold. The decrease of the variable level stack DC electric energy may be predetermined, such as a preset amount for which repeated decreases may be implemented for the DC voltage to not exceed the DC voltage threshold.

In determination block 1010, the control device may determine whether the DC voltage equals the DC voltage threshold. The control device may compare the DC voltage measured in block 906 of the method 900 described with reference to FIG. 9 to the DC voltage threshold. In response to determining that the DC voltage does not equal the DC voltage threshold (e.g., determination block 1010="No"), the control device may repeat determining whether the DC voltage falls short of a DC voltage threshold in determination block 1004.

In response to determining that the DC voltage does equal the DC voltage threshold (e.g., determination block 1010="Yes"), the control device may cease draw of DC electric energy from the second fuel cell (e.g., PEM stack 304 in FIGS. 3-5G) of the fuel hybrid fuel cell system (e.g., hybrid fuel cell system 300, 400a, 400b, 500a-500g in FIGS. 3-5G) in block 1012. The control device may provide a signal to the second fuel cell and/or to the second DC/DC converter (e.g., DC/DC converter 302b in FIGS. 3-5G) that is configured to indicate to cease output and/or draw of the variable level stack DC electric energy. The control device may directly control functions of the second fuel cell and/or of the second DC/DC converter to cease output and/or draw of the variable level stack DC electric energy.

Fuel cell systems of the embodiments of the present disclosure are designed to reduce greenhouse gas emissions and have a positive impact on the climate.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements, including the control device as well as controllers 320 described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

The invention claimed is:

1. A fuel cell system, comprising:
    a first fuel cell of a first electrolyte type;
    a second fuel cell of a second electrolyte type different from the first electrolyte type;
    a first direct current (DC)/DC converter electrically connected to the first fuel cell via a first DC bus;
    a second DC/DC converter electrically connected to the second fuel cell via a second DC bus;
    a DC/alternating current (AC) inverter electrically connected in parallel to the first DC/DC converter and to the second DC/DC converter via a combined DC bus;
    an electric energy storage system;
    a third DC/DC converter electrically connected to the electric energy storage system and configured to output DC electric energy from the electric energy storage system to the DC/AC inverter, wherein the DC/AC inverter is electrically connected in parallel to the first DC/DC converter, to the second DC/DC converter, and to the third DC/DC converter via the combined DC bus; and
    a controller configured with controller executable instructions to perform operations comprising:

drawing DC electric energy from the second fuel cell and a base level DC electric energy from the first fuel cell;

determining whether a DC voltage at the combined DC bus exceeds a DC voltage threshold; and decreasing drawing the DC electric energy from the second fuel cell to a level such that the DC voltage at the combined DC bus falls short of or equals to the DC voltage threshold and continuing drawing the DC electric energy from the second fuel cell at the level and drawing the base level DC electric energy from the first fuel cell in response to determining that the DC voltage at the combined DC bus exceeds the DC voltage threshold.

2. The fuel cell system of claim 1, wherein:
the first fuel cell is a solid oxide fuel cell located in a solid oxide fuel cell stack; and
the second fuel cell is a proton exchange membrane fuel cell located in a proton exchange membrane fuel cell stack.

3. The fuel cell system of claim 2, wherein:
the solid oxide fuel cell stack is fluidly connected to a hydrocarbon fuel source; and
the proton exchange membrane fuel cell stack is fluidly connected to at least one of a hydrogen fuel source or an anode exhaust of the solid oxide fuel cell stack.

4. The fuel cell system of claim 3, wherein the proton exchange membrane fuel cell stack is fluidly connected to the anode exhaust of the solid oxide fuel cell stack.

5. The fuel cell system of claim 4, wherein the proton exchange membrane fuel cell stack is directly fluidly connected to the anode exhaust of the solid oxide fuel cell stack through an anode exhaust conduit or is indirectly fluidly connected to the anode exhaust of the solid oxide fuel cell stack through a hydrogen buffer tank.

6. The fuel cell system of claim 2, wherein the solid oxide fuel cell stack and the proton exchange membrane fuel cell stack are fluidly connected to a hydrogen fuel source.

7. The fuel cell system of claim 1, further comprising a wherein the controller is further configured with controller executable instructions to perform operations comprising:
measuring the DC voltage at the combined DC bus; and
determining whether the DC voltage at the combined DC bus falls short of the DC voltage threshold, wherein drawing the DC electric energy from the second fuel cell comprises
drawing the DC electric energy from the second fuel cell in response to determining that the DC voltage at the combined DC bus falls short of the DC voltage threshold.

8. The fuel cell system of claim 7, wherein:
the measuring the DC voltage at the combined DC bus comprises measuring the DC voltage at the combined DC bus of the base level DC electric energy from the first fuel cell; and
the drawing the DC electric energy from the second fuel cell in response to determining that the DC voltage at the combined DC bus falls short of the DC voltage threshold comprises commencing drawing a variable level DC electric energy from the second fuel cell.

9. The fuel cell system of claim 7, wherein:
the measuring the DC voltage at the combined DC bus comprises measuring the DC voltage at the combined DC bus of the base level DC electric energy from the first fuel cell and a variable level DC electric energy from the second fuel cell; and the drawing the DC electric energy from the second fuel cell in response to determining that the DC voltage at the combined DC bus falls short of the DC voltage threshold comprises increasing draw of the variable level DC electric energy from the second fuel cell.

10. The fuel cell system of claim 7, wherein the controller is further configured with controller executable instructions to perform operations further comprising:
determining whether utility grid power is not available to satisfy the load demand or if an emergency condition has occurred; and
if the utility grid power is not available to satisfy the load demand or if the emergency condition has occurred, then activating the second fuel cell and drawing DC electric energy from the second fuel cell.

11. The fuel cell system of claim 1, wherein:
the drawing the DC electric energy from the second fuel cell comprises drawing a variable level DC electric energy from the second fuel cell; and
the decreasing the drawing of the DC electric energy from the second fuel cell to the level such that the DC voltage at the combined DC bus falls short of or equals to the DC voltage threshold and continuing drawing of the DC electric energy from the second fuel cell at the level in response to determining that the DC voltage at the combined DC bus exceeds the DC voltage threshold comprises decreasing the drawing of the variable level DC electric energy from the second fuel cell in response to determining that the DC voltage at the combined DC bus exceeds the DC voltage threshold.

12. The fuel cell system of claim 11, wherein the controller is further configured with controller executable instructions to perform operations further comprising:
determining whether the DC voltage at the combined DC bus equals the DC voltage threshold; and
ceasing draw of the variable level DC electric energy from the second fuel cell in response to determining that the DC voltage at the combined DC bus equals the DC voltage threshold.

13. A method for operating a fuel cell system, comprising:
drawing, via a first direct current (DC)/DC converter, a base level DC electric energy from a first fuel cell of a first electrolyte type to a combined DC bus;
measuring a DC voltage at the combined DC bus;
determining whether the DC voltage at the combined DC bus falls short of a DC voltage threshold; and
drawing, via a second DC/DC converter, a variable DC electric energy from a second fuel cell of a second electrolyte type different from the first electrolyte type in response to determining that the DC voltage at the combined DC bus falls short of the DC voltage threshold;
determining whether the DC voltage at the combined DC bus exceeds the DC voltage threshold; and
decreasing drawing, via the second DC/DC converter, the variable DC electric energy from the second fuel cell to a level such that the DC voltage at the combined DC bus falls short of or equals to the DC voltage threshold and continuing drawing of the DC electric energy from the second fuel cell at the level and drawing the base level DC electric energy from the first fuel cell in response to determining that the DC voltage at the combined DC bus exceeds the DC voltage threshold;
drawing, via a third DC/DC converter, DC electric energy from an electric energy storage system in response to determining that the DC voltage at the combined DC bus falls short of the DC voltage threshold; and providing a combined DC energy from the combined DC bus to a DC/alternating current (AC) inverter which is electrically connected in parallel to the first DC/DC converter, the second DC/DC converter, and third DC/DC converter via the combined DC bus.

14. The method of claim 13, wherein:

the first fuel cell is a solid oxide fuel cell located in a solid oxide fuel cell stack; and the second fuel cell is a proton exchange membrane fuel cell located in a proton exchange membrane fuel cell stack.

15. The method of claim 14, wherein:

the measuring the DC voltage at the combined DC bus comprises measuring the DC voltage at the combined DC bus of the base level DC electric energy from the first fuel cell; and the drawing the variable DC electric energy from the second fuel cell in response to determining that the DC voltage at the combined DC bus falls short of the DC voltage threshold comprises commencing drawing the variable level DC electric energy from the second fuel cell.

16. The method of claim 14, wherein:

the measuring the DC voltage at the combined DC bus comprises measuring the DC voltage at the combined DC bus of the base level DC electric energy from the first fuel cell and the variable level DC electric energy from the second fuel cell; and the drawing the DC electric energy from the second fuel cell in response to determining that the DC voltage at the combined DC bus falls short of the DC voltage threshold comprises increasing draw of the variable level DC electric energy from the second fuel cell.

17. The method of claim 14, further comprising:

determining whether the DC voltage at the combined DC bus equals the DC voltage threshold; and ceasing drawing the variable level DC electric energy from the second fuel cell in response to determining that the DC voltage at the combined DC bus equals the DC voltage threshold.

18. The method of claim 14, further comprising:

determining whether utility grid power is not available to satisfy the load demand or if an emergency condition has occurred; and if the utility grid power is not available to satisfy the load demand or if the emergency condition has occurred, the activating the second fuel cell and drawing the variable DC electric energy from the second fuel cell.

* * * * *